US012413380B2

(12) United States Patent
Zhou et al.

(10) Patent No.: US 12,413,380 B2
(45) Date of Patent: Sep. 9, 2025

(54) SPATIAL PARAMETERS FOR HALF-DUPLEX AND FULL-DUPLEX COMMUNICATIONS

(71) Applicant: QUALCOMM Incorporated, San Diego, CA (US)

(72) Inventors: Yan Zhou, San Diego, CA (US); Hemant Saggar, San Diego, CA (US); Qian Zhang, Basking Ridge, NJ (US); Tao Luo, San Diego, CA (US); Navid Abedini, Basking Ridge, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 470 days.

(21) Appl. No.: 18/052,509

(22) Filed: Nov. 3, 2022

(65) Prior Publication Data

US 2024/0154781 A1 May 9, 2024

(51) Int. Cl.
*H04L 5/16* (2006.01)
*H04B 7/024* (2017.01)
*H04B 7/06* (2006.01)
*H04L 5/00* (2006.01)
*H04L 5/14* (2006.01)

(52) U.S. Cl.
CPC ..................................... *H04L 5/16* (2013.01)

(58) Field of Classification Search
CPC ........... H04L 5/16; H04L 5/0023; H04L 5/14; H04B 7/06956; H04B 7/024
See application file for complete search history.

(56) References Cited

U.S. PATENT DOCUMENTS

| | | | | |
|---|---|---|---|---|
| 2019/0140811 A1* | 5/2019 | Abedini | .................. | H04B 7/04 |
| 2019/0238174 A1* | 8/2019 | Bengtsson | ................ | H04L 5/14 |
| 2019/0357149 A1* | 11/2019 | Zhang | ................. | H04W 52/146 |
| 2021/0360618 A1* | 11/2021 | Novlan | ............... | H04W 56/001 |
| 2022/0029761 A1* | 1/2022 | Su | ....................... | H04L 27/2613 |
| 2022/0353880 A1* | 11/2022 | Lee | ........................ | H04L 5/0044 |
| 2023/0025637 A1* | 1/2023 | He | ......................... | H04L 5/0051 |
| 2023/0283334 A1* | 9/2023 | Tlich | ........................ | H04L 5/16 |
| | | | | 375/262 |
| 2023/0318798 A1* | 10/2023 | Su | ......................... | H04W 72/54 |
| | | | | 370/329 |
| 2024/0171252 A1* | 5/2024 | Bhamri | ................. | H04L 5/0048 |
| 2025/0097955 A1* | 3/2025 | Guan | .................... | H04B 7/0639 |
| 2025/0119256 A1* | 4/2025 | Matsumura | ......... | H04W 72/232 |

* cited by examiner

*Primary Examiner* — Harry H Kim
(74) *Attorney, Agent, or Firm* — Holland & Hart LLP

(57) ABSTRACT

Methods, systems, and devices for wireless communication are described. In a wireless communication system, a first wireless node may transmit a configuration message indicating one or more spatial configurations for communicating with a second wireless node. A spatial configuration may include one or more different sets of spatial parameters for half-duplex communications and full-duplex communications between the wireless nodes. In some examples, the first wireless node may select a first set of spatial parameters for half-duplex communications or a second set of spatial parameters for full-duplex communications based on an explicit indication or a resource configuration. The wireless nodes may perform half- or full-duplex communications using the first or second set of spatial parameters, respectively, in accordance with the configuration message.

29 Claims, 18 Drawing Sheets

SPATIAL PARAMETERS FOR HALF-DUPLEX AND FULL-DUPLEX COMMUNICATIONS

FIELD OF TECHNOLOGY

The following relates to wireless communication, including spatial parameters for half-duplex and full-duplex communications.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations, each supporting wireless communication for communication devices, which may be known as user equipment (UE).

In some wireless communications systems, wireless nodes (e.g., UEs, network entities) may communicate using half-duplex or full-duplex communications. In some cases, techniques for configuring parameters for such communications may be improved.

SUMMARY

The described techniques relate to improved methods, systems, devices, and apparatuses that support spatial parameters for half-duplex and full-duplex communications. For example, the described techniques provide for a user equipment (UE) (e.g., a first wireless node) indicating separate spatial parameters to use for half-duplex communications and full-duplex communications. In some examples, the UE may transmit a configuration message indicating one or more spatial configurations for communicating with a network entity using half-duplex or full-duplex communications. A spatial configuration may include one or more sets of spatial parameters. For example, the one or more spatial configurations may include a first set of spatial parameters for half-duplex communications, a second set of spatial parameters for full-duplex communications, or both. The UE may select the first or second set of spatial parameters and communicate with the network entity using the selected set of spatial parameters based on transmitting the configuration message. That is, the UE may communicate using half-duplex or full-duplex communications using corresponding spatial parameters. In some examples, the UE may update the second set of spatial parameters associated with the full-duplex communications based on the UE moving through a wireless communications system or to achieve some power savings.

A method for wireless communication is described. The method may include transmitting, by a first wireless node, a configuration message indicating one or more spatial configurations for communications with a second wireless node, where the one or more spatial configurations include: a first set of spatial parameters associated with half-duplex communications with the second wireless node and a second set of spatial parameters associated with full-duplex communications with the second wireless node and communicating, by the first wireless node, with the second wireless node using the first set of spatial parameters or the second set of spatial parameters based on transmitting the configuration message.

An apparatus for wireless communication is described. The apparatus may include a processor, memory coupled with the processor, and instructions stored in the memory. The instructions may be executable by the processor to cause the apparatus to transmit, by a first wireless node, a configuration message indicating one or more spatial configurations for communications with a second wireless node, where the one or more spatial configurations include: a first set of spatial parameters associate with half-duplex communications with the second wireless node and a second set of spatial parameters associate with full-duplex communications with the second wireless node and communicating, by the first wireless node, with the second wireless node used the first set of spatial parameters or the second set of spatial parameters based on transmitting the configuration message.

Another apparatus for wireless communication is described. The apparatus may include means for transmitting, by a first wireless node, a configuration message indicating one or more spatial configurations for communications with a second wireless node, where the one or more spatial configurations include: means for a first set of spatial parameters associated with half-duplex communications with the second wireless node and means for a second set of spatial parameters associated with full-duplex communications with the second wireless node and means for communicating, by the first wireless node, with the second wireless node using the first set of spatial parameters or the second set of spatial parameters based on transmitting the configuration message.

A non-transitory computer-readable medium storing code for wireless communication is described. The code may include instructions executable by a processor to transmit, by a first wireless node, a configuration message indicating one or more spatial configurations for communications with a second wireless node, where the one or more spatial configurations include: a first set of spatial parameters associate with half-duplex communications with the second wireless node and a second set of spatial parameters associate with full-duplex communications with the second wireless node and communicating, by the first wireless node, with the second wireless node used the first set of spatial parameters or the second set of spatial parameters based on transmitting the configuration message.

In some examples of the method, apparatuses, and non-transitory computer-readable medium described herein, the first set of spatial parameters associated with the half-duplex communications with the second wireless node may be associated with a first antenna configuration at the first wireless node or the second wireless node, and where the second set of spatial parameters associated with the full-duplex communications with the second wireless node may be associated with a second antenna configuration at the first wireless node or the second wireless node.

In some examples of the method, apparatuses, and non-transitory computer-readable medium described herein, the configuration message indicates, for each reference signal of a set of multiple reference signals associated with a beam measurement report, a respective set of spatial parameters associated with full-duplex communications via a beam direction corresponding to the reference signal, and where the respective set of spatial parameters for one of the set of multiple reference signals includes the second set of spatial parameters.

Some examples of the method, apparatuses, and non-transitory computer-readable medium described herein may further include operations, features, means, or instructions for identifying an update to a prior set of spatial parameters associated with the full-duplex communications with the second wireless node, where the second set of spatial parameters may be based on the update to the prior set of spatial parameters, and where transmitting the configuration message including the one or more spatial configurations may be based on identifying the update.

In some examples of the method, apparatuses, and non-transitory computer-readable medium described herein, transmitting the configuration message may include operations, features, means, or instructions for transmitting an uplink grant obtained via a scheduling request or an uplink shared channel transmission including the configuration message.

In some examples of the method, apparatuses, and non-transitory computer-readable medium described herein, the configuration message indicates a respective set of downlink spatial parameters, a respective set of uplink spatial parameters, or both for each reference signal of a set of multiple reference signals.

In some examples of the method, apparatuses, and non-transitory computer-readable medium described herein, the communicating with the second wireless node occurs via one or more symbols and the method, apparatuses, and non-transitory computer-readable medium may include further operations, features, means, or instructions for selecting one of the first set of spatial parameters or the second set of spatial parameters to use for the communicating with the second wireless node based on whether the one or more symbols may be configured as half-duplex symbols or may be configured as full-duplex symbols.

Some examples of the method, apparatuses, and non-transitory computer-readable medium described herein may further include operations, features, means, or instructions for receiving a control message indicating the first set of spatial parameters or the second set of spatial parameters and selecting one of the first set of spatial parameters or the second set of spatial parameters to use for the communicating with the second wireless node based on the control message.

In some examples of the method, apparatuses, and non-transitory computer-readable medium described herein, the communicating with the second wireless node occurs via a set of multiple shared channels including a set of multiple downlink shared channels or a set of multiple uplink shared channels and the method, apparatuses, and non-transitory computer-readable medium may include further operations, features, means, or instructions for receiving a control message scheduling the set of multiple shared channels and selecting, for each shared channel of the set of multiple shared channels, one of the first set of spatial parameters or the second set of spatial parameters to use for communicating via the shared channel based on whether the shared channel may be scheduled for one or more half-duplex symbols or may be scheduled for one or more full-duplex symbols.

In some examples of the method, apparatuses, and non-transitory computer-readable medium described herein, the communicating with the second wireless node occurs via a set of multiple shared channels including a set of multiple downlink shared channels or a set of multiple uplink shared channels and the method, apparatuses, and non-transitory computer-readable medium may include further operations, features, means, or instructions for receiving a control message scheduling the set of multiple shared channels and indicating, for each of the set of multiple shared channels, whether the first wireless node may be to use the first set of spatial parameters or the second set of spatial parameters for the shared channel and selecting, for each shared channel of the set of multiple shared channels, one of the first set of spatial parameters or the second set of spatial parameters to use for communicating via the shared channel based on the control message.

In some examples of the method, apparatuses, and non-transitory computer-readable medium described herein, the second set of spatial parameters includes a multiple-input multiple-output parameter, a port parameter, a resource parameter, a transmission-reception point scheme parameter or any combination thereof associated with the full-duplex communications with the second wireless node, and where the second set of spatial parameters may be associated with uplink transmissions or downlink transmissions.

A method for wireless communication is described. The method may include receiving, from a first wireless node at a second wireless node, a configuration message indicating one or more spatial configurations for communications between the first wireless node and the second wireless node, where the one or more spatial configurations include: a first set of spatial parameters associated with half-duplex communications with the second wireless node and a second set of spatial parameters associated with full-duplex communications with the second wireless node and communicating, by the second wireless node, with the first wireless node using the first set of spatial parameters or the second set of spatial parameters based on receiving the configuration message.

An apparatus for wireless communication is described. The apparatus may include a processor, memory coupled with the processor, and instructions stored in the memory. The instructions may be executable by the processor to cause the apparatus to receive, from a first wireless node at a second wireless node, a configuration message indicating one or more spatial configurations for communications between the first wireless node and the second wireless node, where the one or more spatial configurations include: a first set of spatial parameters associate with half-duplex communications with the second wireless node and a second set of spatial parameters associate with full-duplex communications with the second wireless node and communicating, by the second wireless node, with the first wireless node used the first set of spatial parameters or the second set of spatial parameters based on receiving the configuration message.

Another apparatus for wireless communication is described. The apparatus may include means for receiving, from a first wireless node at a second wireless node, a configuration message indicating one or more spatial configurations for communications between the first wireless node and the second wireless node, where the one or more spatial configurations include: means for a first set of spatial parameters associated with half-duplex communications with the second wireless node and means for a second set of spatial parameters associated with full-duplex communications with the second wireless node and means for communicating, by the second wireless node, with the first wireless node using the first set of spatial parameters or the second set of spatial parameters based on receiving the configuration message.

A non-transitory computer-readable medium storing code for wireless communication is described. The code may include instructions executable by a processor to receive, from a first wireless node at a second wireless node, a configuration message indicating one or more spatial configurations for communications between the first wireless node and the second wireless node, where the one or more spatial configurations include: a first set of spatial parameters associate with half-duplex communications with the second wireless node and a second set of spatial parameters associate with full-duplex communications with the second wireless node and communicating, by the second wireless node, with the first wireless node used the first set of spatial parameters or the second set of spatial parameters based on receiving the configuration message.

In some examples of the method, apparatuses, and non-transitory computer-readable medium described herein, the first set of spatial parameters associated with the half-duplex communications with the second wireless node may be associated with a first antenna configuration at the first wireless node or the second wireless node, and where the second set of spatial parameters associated with the full-duplex communications with the second wireless node may be associated with a second antenna configuration at the first wireless node or the second wireless node.

In some examples of the method, apparatuses, and non-transitory computer-readable medium described herein, the configuration message indicates, for each reference signal of a set of multiple reference signals associated with a beam measurement report, a respective set of spatial parameters associated with full-duplex communications via a beam direction corresponding to the reference signal, and where the respective set of spatial parameters for one of the set of multiple reference signals includes the second set of spatial parameters.

Some examples of the method, apparatuses, and non-transitory computer-readable medium described herein may further include operations, features, means, or instructions for receiving the configuration message may be based on an update to a prior set of spatial parameters associated with the full-duplex communications between the first wireless node and the second wireless node, and where the second set of spatial parameters may be based on the update to the prior set of spatial parameters.

In some examples of the method, apparatuses, and non-transitory computer-readable medium described herein, receiving the configuration message may include operations, features, means, or instructions for receiving an uplink grant obtained via a scheduling request or an uplink shared channel transmission including the configuration message.

In some examples of the method, apparatuses, and non-transitory computer-readable medium described herein, the configuration message indicates a respective set of downlink spatial parameters, a respective set of uplink spatial parameters, or both for each reference signal of a set of multiple reference signals.

In some examples of the method, apparatuses, and non-transitory computer-readable medium described herein, the communicating with the first wireless node occurs via one or more symbols and the method, apparatuses, and non-transitory computer-readable medium may include further operations, features, means, or instructions for identifying one of the first set of spatial parameters or the second set of spatial parameters for the communicating with the second wireless node based on whether the one or more symbols may be configured as half-duplex symbols or may be configured as full-duplex symbols.

Some examples of the method, apparatuses, and non-transitory computer-readable medium described herein may further include operations, features, means, or instructions for transmitting a control message indicating the first set of spatial parameters or the second set of spatial parameters, where the communicating with the first wireless node may be based on the indicated one of the first set of spatial parameters or the second set of spatial parameters.

In some examples of the method, apparatuses, and non-transitory computer-readable medium described herein, the communicating with the first wireless node occurs via a set of multiple shared channels including a set of multiple downlink shared channels or a set of multiple uplink shared channels and the method, apparatuses, and non-transitory computer-readable medium may include further operations, features, means, or instructions for transmitting a control message scheduling the set of multiple shared channels, where, for each shared channel of the set of multiple shared channels, whether the first set of spatial parameters or the second set of spatial parameters may be used for communicating via the shared channel may be based on whether the shared channel may be scheduled for one or more half-duplex symbols or may be scheduled for one or more full-duplex symbols.

In some examples of the method, apparatuses, and non-transitory computer-readable medium described herein, the communicating with the first wireless node occurs via a set of multiple shared channels including a set of multiple downlink shared channels or a set of multiple uplink shared channels and the method, apparatuses, and non-transitory computer-readable medium may include further operations, features, means, or instructions for transmitting a control message scheduling the set of multiple shared channels and indicating, for each of the set of multiple shared channels, whether the first wireless node may be to use the first set of spatial parameters or the second set of spatial parameters, where for each shared channel of the set of multiple shared channels, the indicated one of the first set of spatial parameters or the second set of spatial parameters may be used for communicating via the shared channel.

In some examples of the method, apparatuses, and non-transitory computer-readable medium described herein, the second set of spatial parameters includes a multiple-input multiple-output parameter, a port parameter, a resource parameter, a transmission-reception point scheme parameter, or any combination thereof associated with the full-duplex communications with the second wireless node, and where the second set of spatial parameters may be associated with uplink transmissions or downlink transmissions.

DETAILED DESCRIPTION

Figure 1:
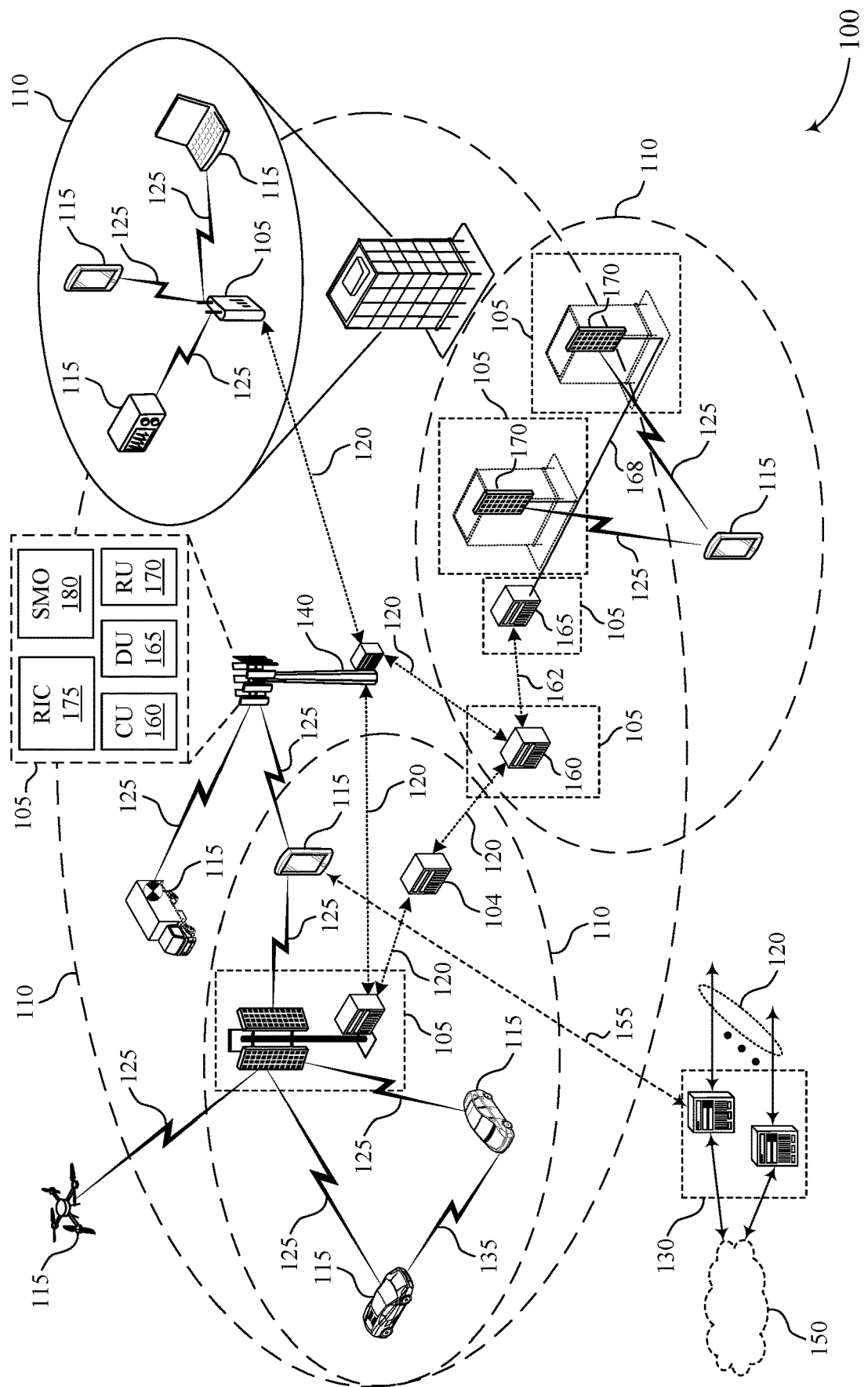
FIG. 1 illustrates an example of a wireless communications system that supports spatial parameters for half-duplex and full-duplex communications in accordance with one or more aspects of the present disclosure.

In some wireless communications systems, a user equipment (UE) may operate using half-duplex communications or full-duplex communications. Using half-duplex communications, the UE may communicate uplink or downlink transmissions at any given time. Alternatively, using full-duplex communications, the UE may communicate uplink and downlink transmissions simultaneously. To reduce power consumption, the UE may use different spatial configurations for half-duplex and full-duplex communications. For example, the UE may use different quantities of antenna panels and antenna elements for uplink or downlink communications.

In some examples, a UE may use different antenna arrays per direction (e.g., uplink and downlink) with fewer antenna elements for full-duplex communications than for half-duplex communications. As such, for scheduling purposes, a network entity may utilize the spatial configuration of the UE for half-duplex or full-duplex communications to efficiently schedule transmissions. For example, the UE may utilize different spatial configurations for half-duplex communications versus full-duplex communications, where a configuration used for half-duplex communications may be optimal for half-duplex communications and sub-optimal for full-duplex communications, and where a different configuration used for full-duplex communications may be optimal for full-duplex communications and sub-optimal for half-duplex communications (e.g., the UE may use different quantities of antenna elements per communication direction for half-duplex versus full-duplex communications). Without knowledge of the spatial configuration, the network entity may fail to update communications with the UE based on whether the UE is operating according to half-duplex or full-duplex, which may result in dropped or failed transmissions. Moreover, the UE failing to update its spatial configurations for half-duplex and full-duplex communications when the UE moves or rotates may result in some performance loss.

The techniques described herein support a UE (e.g., a first wireless node) indicating separate spatial parameters to use for half-duplex communications and full-duplex communications. In some examples, the UE may transmit a configuration message indicating one or more spatial configurations for communicating with a network entity using half-duplex or full-duplex communications. A spatial configuration may include one or more sets of spatial parameters, where the different sets of parameters may relate to the UE's multi-antenna capabilities while operating in a half-duplex mode or a full-duplex mode. For example, the one or more spatial configurations may include a first set of spatial parameters for half-duplex communications, a second set of spatial parameters for full-duplex communications, or both. The UE may select the first or second set of spatial parameters and communicate with the network entity using the selected set of spatial parameters based on transmitting the configuration message. That is, the UE may communicate using half-duplex or full-duplex communications using corresponding spatial parameters. In some examples, the UE may update the second set of spatial parameters associated with the full-duplex communications based on the UE moving through a wireless communications system or to achieve some power savings.

Aspects of the disclosure are initially described in the context of wireless communications systems. Aspects of the disclosure are then described in the context of resource configurations and process flows. Aspects of the disclosure are further illustrated by and described with reference to apparatus diagrams, system diagrams, and flowcharts that relate to spatial parameters for half-duplex and full-duplex communications.

FIG. 1 illustrates an example of a wireless communications system 100 that supports spatial parameters for half-duplex and full-duplex communications in accordance with one or more aspects of the present disclosure. The wireless communications system 100 may include one or more network entities 105, one or more UEs 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via one or more communication links 125 (e.g., a radio frequency (RF) access link). For example, a network entity 105 may support a coverage area 110 (e.g., a geographic coverage area) over which the UEs 115 and the network entity 105 may establish one or more communication links 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be capable of supporting communications with various types of devices, such as other UEs 115 or network entities 105, as shown in FIG. 1.

As described herein, a node of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some examples, network entities 105 may communicate with the core network 130, or with one another, or both. For example, network entities 105 may communicate with the core network 130 via one or more backhaul communication links 120 (e.g., in accordance with an S1, N2, N3, or other interface protocol). In some examples, network entities 105 may communicate with one another via a backhaul communication link 120 (e.g., in accordance with an X2, Xn, or other interface protocol) either directly (e.g., directly between network entities 105) or indirectly (e.g., via a core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication links 120, midhaul communication links 162, or fronthaul communication links 168 may be or include one or more wired links (e.g., an electrical link, an optical fiber link), one or more wireless links (e.g., a radio link, a wireless optical link), among other examples or various combinations thereof. A UE 115 may communicate with the core network 130 via a communication link 155.

One or more of the network entities 105 described herein may include or may be referred to as a base station 140 (e.g., a base transceiver station, a radio base station, an NR base station, an access point, a radio transceiver, a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within a single network entity 105 (e.g., a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among two or more network entities 105, such as an integrated access backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU) 160, a distributed unit (DU) 165, a radio unit (RU) 170, a RAN Intelligent Controller (RIC) 175 (e.g., a Near-Real Time RIC (Near-RT RIC), a Non-Real Time RIC (Non-RT RIC)), a Service Management and Orchestration (SMO) 180 system, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 170 is flexible and may support different functionalities depending on which functions (e.g., network layer functions, protocol layer functions, baseband functions, RF functions, and any combinations thereof) are performed at a CU 160, a DU 165, or an RU 170. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., Radio Resource Control (RRC), service data adaption protocol (SDAP), Packet Data Convergence Protocol (PDCP)). The CU 160 may be connected to one or more DUs 165 or RUs 170, and the one or more DUs 165 or RUs 170 may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or more RUs 170). In some cases, a functional split between a CU 160 and a DU 165, or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to one or more DUs 165 via a midhaul communication link 162 (e.g., F1, F1-c, F1-u), and a DU 165 may be connected to one or more RUs 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities 105 that are in communication via such communication links.

In wireless communications systems (e.g., wireless communications system 100), infrastructure and spectral resources for radio access may support wireless backhaul link capabilities to supplement wired backhaul connections, providing an IAB network architecture (e.g., to a core network 130). In some cases, in an IAB network, one or more network entities 105 (e.g., IAB nodes 104) may be partially controlled by each other. One or more IAB nodes 104 may be referred to as a donor entity or an IAB donor. One or more DUs 165 or one or more RUs 170 may be partially controlled by one or more CUs 160 associated with a donor network entity 105 (e.g., a donor base station 140). The one or more donor network entities 105 (e.g., IAB donors) may be in communication with one or more additional network entities 105 (e.g., IAB nodes 104) via supported access and backhaul links (e.g., backhaul communication links 120). IAB nodes 104 may include an IAB mobile termination (IAB-MT) controlled (e.g., scheduled) by DUs 165 of a coupled IAB donor. An IAB-MT may include an independent set of antennas for relay of communications with UEs 115, or may share the same antennas (e.g., of an RU 170) of an IAB node 104 used for access via the DU 165 of the IAB node 104 (e.g., referred to as virtual IAB-MT (vIAB-MT)). In some examples, the IAB nodes 104 may include DUs 165 that support communication links with additional entities (e.g., IAB nodes 104, UEs 115) within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

For instance, an access network (AN) or RAN may include communications between access nodes (e.g., an IAB donor), IAB nodes 104, and one or more UEs 115. The IAB donor may facilitate connection between the core network 130 and the AN (e.g., via a wired or wireless connection to the core network 130). That is, an IAB donor may refer to a RAN node with a wired or wireless connection to core network 130. The IAB donor may include a CU 160 and at least one DU 165 (e.g., and RU 170), in which case the CU 160 may communicate with the core network 130 via an interface (e.g., a backhaul link). IAB donor and IAB nodes 104 may communicate via an F1 interface according to a protocol that defines signaling messages (e.g., an F1 AP protocol). Additionally, or alternatively, the CU 160 may communicate with the core network via an interface, which may be an example of a portion of backhaul link, and may communicate with other CUs 160 (e.g., a CU 160 associated with an alternative IAB donor) via an Xn-C interface, which may be an example of a portion of a backhaul link.

An IAB node 104 may refer to a RAN node that provides IAB functionality (e.g., access for UEs 115, wireless self-backhauling capabilities). A DU 165 may act as a distributed scheduling node towards child nodes associated with the IAB node 104, and the IAB-MT may act as a scheduled node towards parent nodes associated with the IAB node 104. That is, an IAB donor may be referred to as a parent node in communication with one or more child nodes (e.g., an IAB donor may relay transmissions for UEs through one or more other IAB nodes 104). Additionally, or alternatively, an IAB node 104 may also be referred to as a parent node or a child node to other IAB nodes 104, depending on the relay chain or configuration of the AN. Therefore, the IAB-MT entity of IAB nodes 104 may provide a Uu interface for a child IAB node 104 to receive signaling from a parent IAB node 104, and the DU interface (e.g., DUs 165) may provide a Uu interface for a parent IAB node 104 to signal to a child IAB node 104 or UE 115.

For example, IAB node 104 may be referred to as a parent node that supports communications for a child IAB node, or may be referred to as a child IAB node associated with an IAB donor, or both. The IAB donor may include a CU 160 with a wired or wireless connection (e.g., a backhaul communication link 120) to the core network 130 and may act as parent node to IAB nodes 104. For example, the DU 165 of IAB donor may relay transmissions to UEs 115 through IAB nodes 104, or may directly signal transmissions to a UE 115, or both. The CU 160 of IAB donor may signal communication link establishment via an F1 interface to IAB nodes 104, and the IAB nodes 104 may schedule transmissions (e.g., transmissions to the UEs 115 relayed from the IAB donor) through the DUs 165. That is, data may be relayed to and from IAB nodes 104 via signaling via an NR Uu interface to MT of the IAB node 104. Communications with IAB node 104 may be scheduled by a DU 165 of IAB donor and communications with IAB node 104 may be scheduled by DU 165 of IAB node 104.

In the case of the techniques described herein applied in the context of a disaggregated RAN architecture, one or more components of the disaggregated RAN architecture may be configured to support spatial parameters for half-duplex and full-duplex communications as described herein. For example, some operations described as being performed by a UE 115 or a network entity 105 (e.g., a base station 140) may additionally, or alternatively, be performed by one or more components of the disaggregated RAN architecture (e.g., IAB nodes 104, DUs 165, CUs 160, RUs 170, RIC 175, SMO 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network entities 105 and the network equipment including macro eNBs or gNBs, small cell eNB s or gNB s, or relay base stations, among other examples, as shown in FIG. 1.

The UEs 115 and the network entities 105 may wirelessly communicate with one another via one or more communication links 125 (e.g., an access link) using resources associated with one or more carriers. The term "carrier" may refer to a set of RF spectrum resources having a defined physical layer structure for supporting the communication links 125. For example, a carrier used for a communication link 125 may include a portion of a RF spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities 105).

In some examples, such as in a carrier aggregation configuration, a carrier may also have acquisition signaling or control signaling that coordinates operations for other carriers. A carrier may be associated with a frequency channel (e.g., an evolved universal mobile telecommunication system terrestrial radio access (E-UTRA) absolute RF channel number (EARFCN)) and may be identified according to a channel raster for discovery by the UEs 115. A carrier may be operated in a standalone mode, in which case initial acquisition and connection may be conducted by the UEs 115 via the carrier, or the carrier may be operated in a non-standalone mode, in which case a connection is anchored using a different carrier (e.g., of the same or a different radio access technology).

The communication links 125 shown in the wireless communications system 100 may include downlink transmissions (e.g., forward link transmissions) from a network entity 105 to a UE 115, uplink transmissions (e.g., return link transmissions) from a UE 115 to a network entity 105, or both, among other configurations of transmissions. Carriers may carry downlink or uplink communications (e.g., in an FDD mode) or may be configured to carry downlink and uplink communications (e.g., in a TDD mode).

A carrier may be associated with a particular bandwidth of the RF spectrum, and, in some examples, the carrier bandwidth may be referred to as a "system bandwidth" of the carrier or the wireless communications system 100. For example, the carrier bandwidth may be one of a set of bandwidths for carriers of a particular radio access technology (e.g., 1.4, 3, 5, 10, 15, 20, 40, or 80 megahertz (MHz)). Devices of the wireless communications system 100 (e.g., the network entities 105, the UEs 115, or both) may have hardware configurations that support communications using a particular carrier bandwidth or may be configurable to support communications using one of a set of carrier bandwidths. In some examples, the wireless communications system 100 may include network entities 105 or UEs 115 that support concurrent communications using carriers associated with multiple carrier bandwidths. In some examples, each served UE 115 may be configured for operating using portions (e.g., a sub-band, a BWP) or all of a carrier bandwidth.

Signal waveforms transmitted via a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both), such that a relatively higher quantity of resource elements (e.g., in a transmission duration) and a relatively higher order of a modulation scheme may correspond to a relatively higher rate of communication. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

One or more numerologies for a carrier may be supported, and a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the network entities 105 or the UEs 115 may be expressed in multiples of a basic time unit which may, for example, refer to a sampling period of $T_s=1/(\Delta f_{max} \cdot N_f)$ seconds, for which $\Delta f_{max}$ may represent a supported subcarrier spacing, and N f may represent a supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively-numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems 100, a slot may further be divided into multiple mini-slots associated with one or more symbols. Excluding the cyclic prefix, each symbol period may be associated with one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed for communication using a carrier according to various techniques. A physical control channel and a physical data channel may be multiplexed for signaling via a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

A network entity 105 may provide communication coverage via one or more cells, for example a macro cell, a small cell, a hot spot, or other types of cells, or any combination thereof. The term "cell" may refer to a logical communication entity used for communication with a network entity 105 (e.g., using a carrier) and may be associated with an identifier for distinguishing neighboring cells (e.g., a physical cell identifier (PCID), a virtual cell identifier (VCID), or others). In some examples, a cell also may refer to a coverage area 110 or a portion of a coverage area 110 (e.g., a sector) over which the logical communication entity operates. Such cells may range from smaller areas (e.g., a structure, a subset of structure) to larger areas depending on various factors such as the capabilities of the network entity 105. For example, a cell may be or include a building, a subset of a building, or exterior spaces between or overlapping with coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered network entity 105 (e.g., a lower-powered base station 140), as compared with a macro cell, and a small cell may operate using the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A network entity 105 may support one or multiple cells and may also support communications via the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a network entity 105 (e.g., a base station 140, an RU 170) may be movable and therefore provide communication coverage for a moving coverage area 110. In some examples, different coverage areas 110 associated with different technologies may overlap, but the different coverage areas 110 may be supported by the same network entity 105. In some other examples, the overlapping coverage areas 110 associated with different technologies may be supported by different network entities 105. The wireless communications system 100 may include, for example, a heterogeneous network in which different types of the network entities 105 provide coverage for various coverage areas 110 using the same or different radio access technologies.

The wireless communications system 100 may support synchronous or asynchronous operation. For synchronous operation, network entities 105 (e.g., base stations 140) may have similar frame timings, and transmissions from different network entities 105 may be approximately aligned in time. For asynchronous operation, network entities 105 may have different frame timings, and transmissions from different network entities 105 may, in some examples, not be aligned in time. The techniques described herein may be used for either synchronous or asynchronous operations.

Some UEs 115 may be configured to employ operating modes that reduce power consumption, such as half-duplex communications (e.g., a mode that supports one-way communication via transmission or reception, but not transmission and reception concurrently). In some examples, half-duplex communications may be performed at a reduced peak rate. Other power conservation techniques for the UEs 115 include entering a power saving deep sleep mode when not engaging in active communications, operating using a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be configured to support communicating directly with other UEs 115 via a device-to-device (D2D) communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by (e.g., scheduled by) the network entity 105. In some examples, one or more UEs 115 of such a group may be outside the coverage area 110 of a network entity 105 or may be otherwise unable to or not configured to receive transmissions from a network entity 105. In some examples, groups of the UEs 115 communicating via D2D communications may support a one-to-many (1:M) system in which each UE 115 transmits to each of the other UEs 115 in the group. In some examples, a network entity 105 may facilitate the scheduling of resources for D2D communications. In some other examples, D2D communications may be carried out between the UEs 115 without an involvement of a network entity 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. UHF waves may be blocked or redirected by buildings and environmental features, which may be referred to as clusters, but the waves may penetrate structures sufficiently for a macro cell to provide service to the UEs 115 located indoors. Communications using UHF waves may be associated with smaller antennas and shorter ranges (e.g., less than 100 kilometers) compared to communications using the smaller frequencies and longer waves of the high frequency (HF) or very high frequency (VHF) portion of the spectrum below 300 MHz.

The wireless communications system 100 may utilize both licensed and unlicensed RF spectrum bands. For example, the wireless communications system 100 may employ License Assisted Access (LAA), LTE-Unlicensed (LTE-U) radio access technology, or NR technology using an unlicensed band such as the 5 GHz industrial, scientific, and medical (ISM) band. While operating using unlicensed RF spectrum bands, devices such as the network entities 105 and the UEs 115 may employ carrier sensing for collision detection and avoidance. In some examples, operations using unlicensed bands may be based on a carrier aggregation configuration in conjunction with component carriers operating using a licensed band (e.g., LAA). Operations using unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located at diverse geographic locations. A network entity 105 may include an antenna array with a set of rows and columns of antenna ports that the network entity 105 may use to support beamforming of communications with a UE 115. Likewise, a UE 115 may include one or more antenna arrays that may support various MIMO or beamforming operations. Additionally, or alternatively, an antenna panel may support RF beamforming for a signal transmitted via an antenna port.

The network entities 105 or the UEs 115 may use MIMO communications to exploit multipath signal propagation and increase spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry information associated with the same data stream (e.g., the same codeword) or different data streams (e.g., different codewords). Different spatial layers may be associated with different antenna ports used for channel measurement and reporting. MIMO techniques include single-user MIMO (SU-MIMO), for which multiple spatial layers are transmitted to the same receiving device, and multiple-user MIMO (MU-MIMO), for which multiple spatial layers are transmitted to multiple devices.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating along particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A network entity 105 or a UE 115 may use beam sweeping techniques as part of beamforming operations. For example, a network entity 105 (e.g., a base station 140, an RU 170) may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a network entity 105 multiple times along different directions. For example, the network entity 105 may transmit a signal according to different beamforming weight sets associated with different directions of transmission. Transmissions along different beam directions may be used to identify (e.g., by a transmitting device, such as a network entity 105, or by a receiving device, such as a UE 115) a beam direction for later transmission or reception by the network entity 105.

Some signals, such as data signals associated with a particular receiving device, may be transmitted by transmitting device (e.g., a transmitting network entity 105, a transmitting UE 115) along a single beam direction (e.g., a direction associated with the receiving device, such as a receiving network entity 105 or a receiving UE 115). In some examples, the beam direction associated with transmissions along a single beam direction may be determined based on a signal that was transmitted along one or more beam directions. For example, a UE 115 may receive one or more of the signals transmitted by the network entity 105 along different directions and may report to the network entity 105 an indication of the signal that the UE 115 received with a highest signal quality or an otherwise acceptable signal quality.

In some examples, transmissions by a device (e.g., by a network entity 105 or a UE 115) may be performed using multiple beam directions, and the device may use a combination of digital precoding or beamforming to generate a combined beam for transmission (e.g., from a network entity 105 to a UE 115). The UE 115 may report feedback that indicates precoding weights for one or more beam directions, and the feedback may correspond to a configured set of beams across a system bandwidth or one or more sub-bands. The network entity 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted along one or more directions by a network entity 105 (e.g., a base station 140, an RU 170), a UE 115 may employ similar techniques for transmitting signals multiple times along different directions (e.g., for identifying a beam direction for subsequent transmission or reception by the UE 115) or for transmitting a signal along a single direction (e.g., for transmitting data to a receiving device).

A receiving device (e.g., a UE 115) may perform reception operations in accordance with multiple receive configurations (e.g., directional listening) when receiving various signals from a receiving device (e.g., a network entity 105), such as synchronization signals, reference signals, beam selection signals, or other control signals. For example, a receiving device may perform reception in accordance with multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned along a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or PDCP layer may be IP-based. An RLC layer may perform packet segmentation and reassembly to communicate via logical channels. A MAC layer may perform priority handling and multiplexing of logical channels into transport channels. The MAC layer also may implement error detection techniques, error correction techniques, or both to support retransmissions to improve link efficiency. In the control plane, an RRC layer may provide establishment, configuration, and maintenance of an RRC connection between a UE 115 and a network entity 105 or a core network 130 supporting radio bearers for user plane data. A PHY layer may map transport channels to physical channels.

Wireless nodes in the wireless communications system 100 (e.g., UEs 115, network entities 105, IAB nodes, and the like) may operate using half-duplex communications, where a wireless node may communicate via a downlink beam or an uplink beam at any given time, or full-duplex communications, where the wireless node may communicate via downlink and uplink beams simultaneously. In half-duplex and full-duplex scenarios, a UE 115 may utilize a particular spatial configuration to communicate most effectively, where a spatial configuration may include spatial parameters such as a quantity of antenna panels per direction (e.g., uplink and downlink) and a quantity of antenna elements per antenna panel, among other spatial parameters.

In some cases, a UE 115 operating using full-duplex communications may use a different spatial configuration from a UE 115 operating using half-duplex communications. For example, a UE 115 and a wireless node (e.g., a cell, a network entity 105) may both communicate using half-duplex communications each using an antenna panel with eight antenna elements for uplink or downlink communications. If the UE 115 and the wireless node instead operate in full-duplex communications, the UE 115 may divide the antenna panel with eight antenna elements (used for half-duplex communications) into two sub-panels with four antenna elements each (e.g., half a quantity of antenna elements as for half-duplex communications), where each sub-panel may be associated with a direction of communications (e.g., uplink or downlink). As such, the UE 115 and the wireless node using full-duplex communications may use a smaller antenna panel per direction than for half-duplex communications.

Some network entities 105 may support sub-band full-duplex (SBFD) communications, where a network entity 105 may communicate with some UEs 115 via uplink beams and some other UEs 115 via downlink beams via using respective uplink and downlink resources (e.g., symbols, resource blocks). The UEs 115 (using half-duplex communications) may be separated in the frequency domain such that the network entity 105 receives uplink communications and transmits downlink communications to different UEs 115 via different frequency resources but in the same transmission time interval.

In some cases, the wireless communications system 100 may support a single TRP or a multi-TRP (mTRP) scenario, where a UE 115 may communicate with one or multiple TRPs using half-duplex communications. For example, the UE 115 may communicate with a single TRP using one downlink beam or one uplink beam (e.g., one transmission configuration indicator (TCI)) at a time. That is, the UE 115 and the TRP may operate using half-duplex communications, where each device may use one antenna panel to communicate either uplink or downlink communications. Alternatively, the UE 115 may communicate with multiple TRPs using two downlink TCIs at one time, where the UE 115 and the TRPs operate using half-duplex communications. In such cases, the UE 115 may communicate with one cell or network entity 105 that supports two TRPs such that the UE 115 may communicate with a first TRP using a first downlink antenna panel and beam and a second TRP using a second downlink antenna panel and beam.

Alternatively, the UE 115 may communicate with multiple TRPs using two uplink TCIs at one time, where the UE 115 and the TRPs operate using half-duplex communications. In such cases, the UE 115 may communicate with one cell or network entity 105 that supports two TRPs such that the UE 115 may communicate with a first TRP using a first uplink antenna panel and beam and a second TRP using a second uplink antenna panel and beam. Using full-duplex communications, one or more of the TRPs may perform uplink and downlink communications. As such, the UE 115 may communicate with the one or more TRPs using multiple uplink beams and multiple downlink beams.

In some examples, a UE 115, a network entity 105 or both may switch from half-duplex communications to full-duplex communications or from full-duplex communications to half-duplex communications. As the wireless nodes may use different spatial configurations for each type of communications (e.g., different quantities of antenna panels and elements per direction), the wireless nodes may experience degraded communications after switching if they fail to update the spatial configurations. For example, the network entity 105 may switch to using fewer antennas, which may impact a signal transmitted to the UE 115 (based on the signal being beamformed by fewer antennas). If the network entity 105 fails to inform the UE 115 of this change, the UE 115 may fail to properly receive and decode the signal.

Moreover, half-duplex communications and full-duplex communications may correspond to different durations (e.g., resources, half- or full-duplex symbols and slots). For example, a UE 115 may split an antenna panel utilized for half-duplex communications into two sub-panels for full-duplex communications per direction (e.g., per TCI) with fewer antenna elements than that for half-duplex communications (e.g., four antenna elements instead of eight antenna elements). For scheduling purposes, the network entity 105 may utilize these parameters for half-duplex or full-duplex communications to efficiently schedule transmissions. Without knowledge of the spatial configuration and included sets of spatial parameters (e.g., a maximum quantity of antenna ports per TCI state for full-duplex communications), the network entity 105 may fail to update communications with the UE 115 based on whether the UE 115 is operating according to half-duplex or full-duplex, which may result in dropped or failed transmissions. Moreover, if the UE 115 moves or rotates through the wireless communications system 100 and fails to update its spatial configurations for half-duplex and full-duplex communications, the UE 115 may experience degraded performance.

The wireless communications system 100 may support separate spatial parameters for half-duplex and full-duplex communications between two wireless nodes (e.g., a UE 115 and a network entity 105). A UE 115 may transmit a configuration message indicating one or more spatial configurations for communicating with a network entity 105 using half-duplex or full-duplex communications. A spatial configuration may include one or more sets of spatial parameters. For example, the one or more spatial configurations may include a first set of spatial parameters for half-duplex communications, a second set of spatial parameters for full-duplex communications, or both. The UE 115 may select the first or second set of spatial parameters and communicate with the network entity 105 using the selected set of spatial parameters based on transmitting the configuration message. That is, the UE 115 may communicate using half-duplex or full-duplex communications using corresponding spatial parameters. In some examples, the UE 115 may update the second set of spatial parameters associated with the full-duplex communications based on the UE 115 moving through a wireless communications system or to achieve some power savings.

Figure 2:
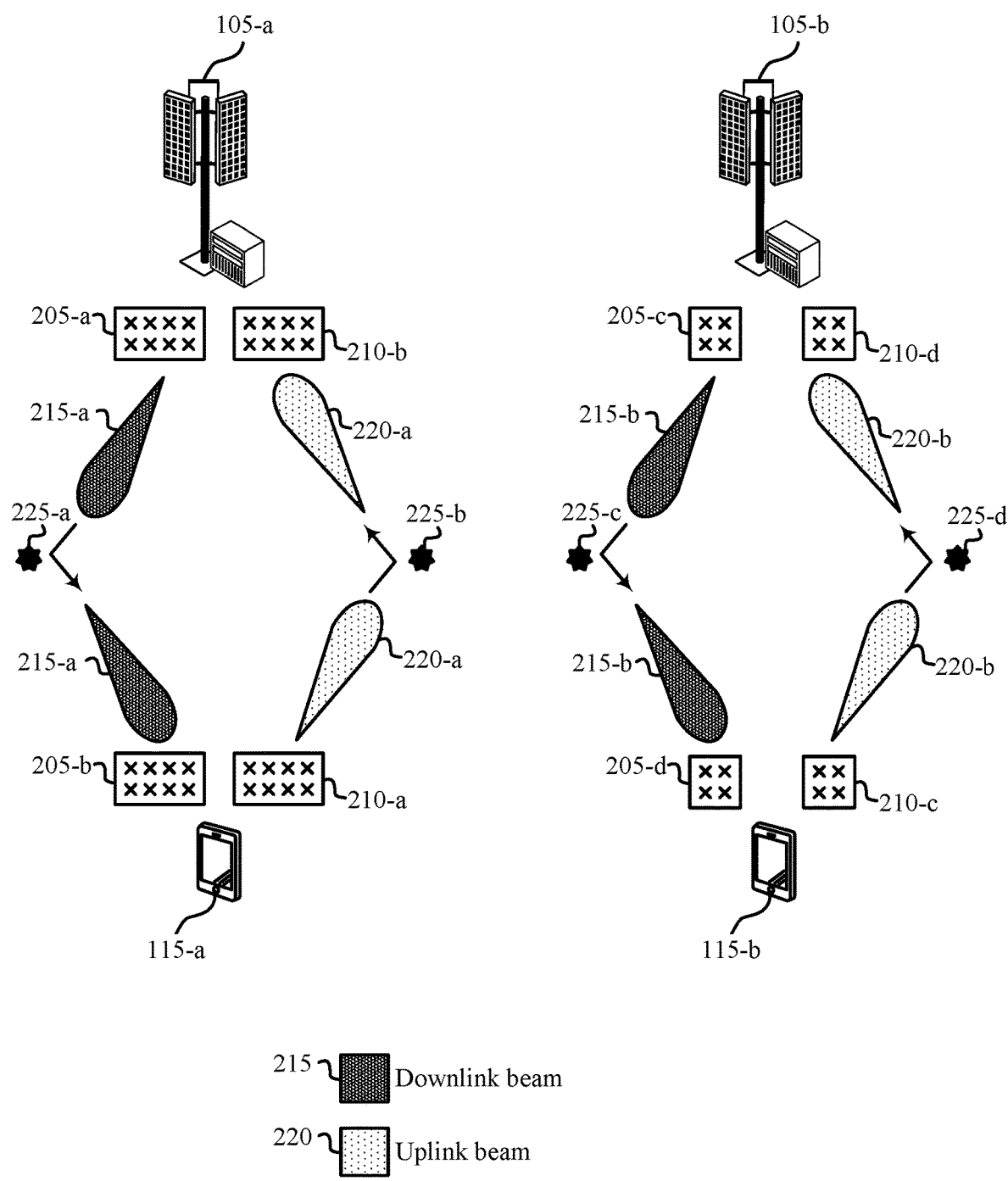
FIG. 2 illustrates an example of a wireless communications system that supports spatial parameters for half-duplex and full-duplex communications in accordance with one or more aspects of the present disclosure.

FIG. 2 illustrates an example of a wireless communications system 200 that supports spatial parameters for half-duplex and full-duplex communications in accordance with one or more aspects of the present disclosure. In some examples, the wireless communications system 200 may implement aspects of the wireless communications system 100 or may be implemented by aspects of the wireless communications system 100. For example, the wireless communications system 200 may include UEs 115 (e.g., first wireless nodes) and network entities 105 (e.g., second wireless nodes), which may communicate using full-duplex communications. The UEs 115 and the network entities 105 may use antenna panels 205 for downlink communications and antenna panels 210 for uplink communications, which may each include some quantity of antenna elements. In addition, the UEs 115 may communicate with respective network entities 105 via downlink beams 215 for downlink communications and uplink beams 220 for uplink communications.

A UE 115, a network entity 105, or both may use different spatial configurations for half-duplex communications and full-duplex communications, where a spatial configuration may include one or more sets or spatial parameters for wireless communications between the UE 115 and the network entity 105, where the spatial parameters may relate to the UE's multi-antenna capabilities while operating in a half-duplex mode or a full-duplex mode. Some spatial parameters may include a MIMO parameter, a port parameter, a resource parameters, TRP scheme parameters, or any combination thereof, which may be associated with uplink or downlink transmissions. In some examples, a first set of spatial parameters associated with half-duplex communications between the UE 115 and the network entity 105 may be associated with a first antenna configuration at the UE 115 or the network entity 105, and a second set of spatial parameters associated with full-duplex communications between the UE 115 and the network entity 105 may be associated with a second antenna configuration at the UE 115 or the network entity 105. For example, a set of spatial parameters may include a quantity of antenna panels per transmission direction (e.g., uplink and downlink) and a quantity of antenna elements per panel, among other spatial parameters.

Operating using half-duplex communications, the UE 115 and the network entity 105 may communicate downlink signals using antenna panels 205 and downlink beams 215 during a first time resource (e.g., a resource block). In some examples, during a subsequent time resource, the UE 115 and the network entity 105 may communicate uplink signal using antenna panels 210 and uplink beams 220. That is, at any given time, the UE 115 and the network entity 105 may communicate via uplink or downlink (but not both). For such half-duplex communications, the UE 115 and the network entity 105 may each support a single antenna panel 205 for downlink and a single antenna panel 210 for uplink, where each antenna panel may include some quantity of antenna elements (e.g., eight).

As an example of using full-duplex communications, a UE 115, a network entity 105, or both may use the same or different spatial parameters as for half-duplex communications. As described with reference to FIG. 2, the UE 115-*a* and the network entity 105-*a* may both operate using full-duplex communications. The UE 115-*a* and the network entity 105-*a* may support the same quantities of antenna panels and antenna elements per direction as for half-duplex communications. That is, the network entity 105-*a* may transmit downlink signals to the UE 115-*a* using an antenna panel 205-*a* and via a downlink beam 215-*a*, and the UE 115-*a* may receive the downlink signals via an antenna panel 205-*b*. In some examples, the downlink beam 215-*a* may be reflected off a reflector 225-*a*. Simultaneously, the UE 115-*a* may transmit uplink signals to the network entity 105-*a* using an antenna panel 210-*a* and via an uplink beam 220-*a*, and the network entity 105-*a* may receive the uplink signals via an antenna panel 210-*b*. In some examples, the uplink beam 220-*a* may be reflected off a reflector 225-*b*. The antenna panel 205-*a* and the antenna panel 205-*b* for downlink and the antenna panel 210-*a* and the antenna panel 210-*b* for uplink may each include some quantity of antenna elements (e.g., eight). In this way, the UE 115-*a* and the network entity 105-*a* may use a same quantity of antenna panels per direction and a same quantity of antenna elements per antenna panel for full-duplex communications as for half-duplex communications (e.g., the first set of spatial parameters for half-duplex communications and the second set of spatial parameters for full-duplex communications may be the same). The full-duplex communications may include transmissions that are overlapping in frequency or non-overlapping in frequency (e.g., in cases of SBFD operations).

Alternatively, when using full-duplex communications, the UE 115-*b* and the network entity 105-*b* may use different sets of spatial parameters for half-duplex communications and full-duplex communications. For example, the UE 115-*b* and the network entity 105-*a* may support different quantities of antenna elements per antenna panel per direction as for half-duplex communications. To utilize the different spatial parameters in this way, the UE 115-*b* may report one or more spatial configurations (e.g., downlink and uplink spatial configurations) for full-duplex communications in a static manner (e.g., via UE capability signaling). For example, the UE 115-*b* (or some other first wireless node) may transmit a configuration message indicating one or more spatial configurations for communications with the network entity 105-*b* (or some other second wireless node).

A spatial configuration may include spatial parameters associated with performing half-duplex or full-duplex communication, such as rank of communications, a quantity of antenna ports, and supported mTRP configurations (e.g., schemes), among other parameters. In this way, the one or more spatial configurations included in the configuration message may include a first set of spatial parameters associated with half-duplex communications with the network entity 105-*b* and a second set of spatial parameters associated with full-duplex communications with the network entity 105-*b*.

In some cases, the first and second sets of parameters may vary based on whether the UE 115-*b* is performing uplink or downlink communications. For example, the UE 115-*b* may communicate with the network entity 105-*b* via the downlink beam 215-*b* (e.g., using a physical downlink shared channel (PDSCH), CSI-RS s), where the network entity 105-*b* supports a single TRP. In such cases, the second set of spatial parameters for full-duplex communications (e.g., parameters for configuring the antenna panel 205-*d*) may include a maximum quantity of MIMO layers per PDSCH, a maximum quantity of ports per CSI-RS resource or across all simultaneously-received CSI-RS resources, where the CSI-RS may be for CSI reporting purposes (e.g., a channel measurement resource (CMR), an interference measurement resource (IMR)), for beam management purposes, or tracking reference signal (TRS) purposes, or both.

Alternatively, the UE 115-*b* may communicate with the network entity 105-*b* via the downlink beam 215-*b* (e.g., via a PDSCH), where the network entity 105-*b* may support an mTRP scheme. The UE 115-*b* may indicate its capability to support such downlink mTRP schemes in the configuration message. Such downlink mTRP schemes may include spatial division multiplexing (SDM), FDM, TDM, or SFN-based single downlink control information (sDCI) mTRP and multi-DCI (mDCI) mTRP communications. The second set of spatial parameters for full-duplex communications (e.g., parameters for configuring the antenna panel 205-*d*) may include a maximum quantity of MIMO layers across all simultaneously received PDSCHs, one or more PDSCH demodulation reference signal (DMRS) port combinations for two TRPs for SDM-based sDCI mTRP schemes (e.g., 1+1, 2+2, 2+1, 1+3, 3+1), a maximum quantity of ports used for downlink phase tracking reference signal (PTRS) transmissions, or any combination thereof.

In some cases, the first and second sets of parameters may be included in one or more uplink spatial configurations. For example, the UE 115-*b* may communicate with the network entity 105-*b* via the uplink beam 220-*b* (e.g., using a physical uplink shared channel (PUSCH), a sounding reference signal (SRS)), where the network entity 105-*b* may support a single TRP. Such communications may be codebook or non-codebook based. The second set of spatial parameters for full-duplex communications (e.g., parameters for configuring the antenna panel 210-*c*) may include a maximum quantity of MIMO layers per PUSCH, a maximum quantity of SRS resources per SRS resource set, a maximum quantity of ports per SRS resource for codebook-based precoding, SRS port coherence types for codebook-based precoding (e.g., fully, partially, or non-coherent), a maximum quantity of simultaneously transmitted SRS resources for non-codebook-based precoding, a maximum quantity of ports per CSI-RS resource, or across all simultaneously-received CSI-RS resources for non-codebook-based precoding, or any combination thereof.

Alternatively, the UE 115-*b* may communicate with the network entity 105-*b* via the uplink beam 220-*b* (e.g., via a PUSCH or a PUCCH), where the network entity 105-*b* may support an mTRP scheme. The UE 115-*b* may indicate its capability to support such uplink mTRP schemes in the configuration message. Such uplink mTRP schemes may include SDM, FDM, TDM, or SFN-based sDCI mTRP and mDCI mTRP communications. The second set of spatial parameters for full-duplex communications (e.g., parameters for configuring the antenna panel 210-*c*) may include a maximum quantity of MIMO layers across all simultaneously transmitted PUSCHs, PUSCH DMRS port combinations for two TRPs (e.g., 1+2, 2+2, 2+1, 1+3, 3+1), at least for SDM-based sDCI mTRP communications, a maximum quantity of ports for uplink PTRS transmissions, or any combination thereof. In some cases, the UE 115-*b* may communicate with the network entity 105-*b* using codebook-based or non-codebook-based precoding in accordance with the second set of spatial parameters.

The UE 115-*b* may communicate with the network entity 105-*b* (e.g., or some other wireless node) using the first set of spatial parameters or the second set of spatial parameters based on transmitting the configuration message. For example, the network entity 105-*b* may transmit downlink signals to the UE 115-*b* using an antenna panel 205-*c* and via a downlink beam 215-*b*, and the UE 115-*b* may receive the downlink signals via an antenna panel 205-*d*. In some examples, the downlink beam 215-*b* may be reflected off a reflector 225-*c*. Simultaneously, the UE 115-*b* may transmit uplink signals to the network entity 105-*b* using an antenna panel 210-*c* and via an uplink beam 220-*b*, and the network entity 105-*b* may receive the uplink signals via an antenna panel 210-*d*. In some examples, the uplink beam 220-*b* may be reflected off a reflector 225-*d*. The antenna panel 205-*c* and the antenna panel 205-*d* for downlink and the antenna panel 210-*c* and the antenna panel 210-*d* for uplink may each include some quantity of antenna elements (e.g., four). In this way, the UE 115-*b* and the network entity 105-*b* may use fewer antenna elements per antenna panel (e.g., four instead of eight) for full-duplex communications as for half-duplex communications. That is, the first set of spatial parameters for half-duplex communications and the second set of spatial parameters for full-duplex communications may be different as indicated in the one or more spatial configurations.

In some examples, one of the UE 115-*b* or the network entity 105-*b* may use the same spatial parameters for full-duplex communications as for half-duplex communications, while the other wireless node uses different spatial parameters. For example, the network entity 105-*b* may support the antenna panel 205-*c* and the antenna panel 210-*d* each with four antenna elements (e.g., different from full-duplex communications) while the UE 115-*a* supports the antenna panel 205-*d* and the antenna panel 210-*c* each with eight antenna elements (e.g., the same as for half-duplex communications). Alternatively, the network entity 105-*b* may support the antenna panel 205-*c* and the antenna panel 210-*d* each with eight antenna elements (e.g., the same as for half-duplex communications) while the UE 115-*a* supports the antenna panel 205-*d* and the antenna panel 210-*c* each with four antenna elements (e.g., different from half-duplex communications).

The UE 115-*b* may dynamically report updated spatial configurations because of movement or rotation of the UE 115-*b* through the wireless communications system 200, or to increase power savings. For example, the UE 115-*b* may have multiple antenna panels (e.g., combinations of antenna panels 205 for downlink and antenna panels 210 for uplink) physically located at different positions (e.g., on the top, bottom, left, or right of a mobile device). Depending on a position in space, a location, and communication requirements of the UE 115-*b*, one or more antenna panels may provide a quality communication link. In some examples some of these antenna panels may be combined together to form a beam in downlink, uplink, or both (e.g., when the UE 115-*b* is operating in a half-duplex mode).

In some examples, full-duplex communications may require different antenna panels or combination of antenna panels for downlink and uplink communications at the UE 115-*b*. Motion of UE 115-*b* may alter which antenna panels or antenna panel combinations may be used for uplink and downlink in full-duplex communications, and may require an update to a spatial configuration. That is, the UE 115-*b* may rotate to a position in which some of its antenna panels are blocked or otherwise unable to support full-duplex communications. Additionally, or alternatively, the UE 115-*b* may move through the wireless communications system 200 to a location where one or more antenna panels may be blocked (e.g., by a building, geographical feature, etc.) or reflected in such a way that may limit full-duplex functionalities. In such scenarios, the UE 115-*b* may update the one or more spatial configurations (for half-duplex communications, full-duplex communications, or both) to update parameters used to perform full-duplex communications with the network entity 105-*b*.

For each reported downlink reference signal in a beam measurement report scheduled by the network entity 105-*b*, the UE 115-*b* may report one or more associated spatial configurations (e.g., for downlink, uplink, or both) to be used for full-duplex communications between the UE 115-*b* and the network entity 105-*b*. That is, the UE 115-*b* may transmit the configuration message based on receiving a request for beam measurement report. The UE 115-*b* may use each reported downlink reference signal and a beam indication reference signal (e.g., downlink, uplink, or both) in the full-duplex communications. In this way, the UE 115-*b* may transmit the configuration message to the network entity 105-*b*, where the configuration message may indicate, for each reference signal of a set of reference signals associated with a beam measurement report, a respective set of spatial parameters associated with full-duplex communications (e.g., based on a reference signal measurement being performed using the indicated full-duplex spatial configuration) via a beam direction corresponding to the reference signal, and where the respective set of spatial parameters for one of the plurality of reference signals may include the second set of spatial parameters for the full-duplex communications.

In some cases, the UE 115-*b* may indicate the sets of spatial parameters associated with one or more reference signals in different scenarios. For example, in a group-based report, the UE 115-*b* may report both downlink and uplink spatial configurations for a first synchronization signal block (SSB) (e.g., SSB1) and a second SSB (e.g., SSB2), which may indicate a downlink beam 215 plus an uplink beam 220 (e.g., the downlink beam 215-*b*+the uplink beam 220-*b*) to be used in full-duplex communications. In some other cases, in a group-based beam measurement report with two downlink reference signals per reported group, the UE 115-*b* may report both downlink and uplink spatial configurations for the first SSB (e.g., SSB1) and the second SSB (e.g., SSB2) in a reported downlink reference signal group, which may indicate a downlink beam 215 plus an uplink beam 220 (e.g., the downlink beam 215-*b*+the uplink beam 220-*b*) or two downlink beams 215 plus two uplink beams 220 to be used in full-duplex communications.

The downlink and uplink spatial configurations associated with the group-based reports may include different combinations of spatial parameters as described herein (e.g., rank, quantity of ports, quantity of MIMO layers, etc.). Moreover, each reported downlink reference signal in a beam measurement report may be an SSB or a CSI-RS. In some cases, the beam measurement report may also include other L1 metrics for the downlink reference signal, such as an L1-reference signal received power (RSRP) or an L1-signal-interference-to-noise ratio (SINR), among other metrics. In addition to the one or more spatial configurations that may include one or more sets of spatial parameters for full-duplex communications, the UE 115-*b* may report one or more spatial configurations that include spatial parameters for half-duplex configurations for a same downlink reference signal (if the UE 115-*b* is operating using half-duplex communications). In some cases, instead of a downlink reference signal, the reported spatial configurations for full-duplex communications may be associated with a downlink, uplink, or joint TCI, a UE panel identifier, or both.

In some examples, to decrease system overhead and latency, the UE 115-*b* may transmit the configuration message (e.g., a report) including the one or more spatial configurations in response to a triggering event. For example, the UE 115-*b* may be triggered to transmit the configuration message if the one or more spatial configurations change. The UE 115-*b* may identify an update to a prior set of spatial parameters associated with full-duplex communications with the network entity 105-*b*, where the second set of spatial parameters for the full-duplex communications is based on the update to the prior set of spatial parameters, and where the UE 115-*b* may transmit the configuration message based on identifying the update. In some examples, the UE 115-*b* may transmit via an uplink grant or via an uplink shared channel transmission including the configuration message. For example, the UE 115-*b* may transmit the report in a MAC control element (MAC-CE) included in an uplink grant obtained from a scheduling request, or in a PUCCH transmission.

For cases in which the UE 115-*b* uses uplink reference signals to indicate downlink beams 215 or uplink beams 220 to use for full-duplex communications with the network entity 105-*b*, the UE 115-*b* may report the one or more spatial configurations (e.g., for uplink or downlink communications) associated with each configured uplink reference signal, such as SRS resources. That is, the configuration message may indicate a respective set of downlink spatial parameters, a respective set of uplink spatial parameters, or both for each reference signal of a set of reference signals. For example, if the network entity 105-*b* uses a first SRS (e.g., SRS1) and a second SRS (e.g., SRS2) to indicate a downlink beam 215 and an uplink beam 220 to be used in full-duplex communications between the UE 115-*b* and the network entity 105-*b*, the network entity 105-*b* may assume respective downlink spatial parameters and respective uplink spatial parameters. For example, at the network entity 105-*b*, the downlink spatial parameters may be the parameters reported along with the first SRS (e.g., SRS1), the downlink beam may be the beam used to receive the first SRS (e.g., SRS1), the uplink spatial parameters may be the parameters reported along with the second SRS (e.g., SRS2), and the uplink beam may be the beam used to receive the second SRS (e.g., SRS2).

The association between the respective downlink and uplink spatial parameters and each uplink reference signal may be fixed after the reference signal is configured (e.g., via an indication in one or more additional bits in the configuration message), or the UE 115-*b* may dynamically update the association (e.g., via a UE-initiated update or a network entity-initiated update). In this way, the UE 115-*b* may update and apply the respective downlink spatial parameters and respective uplink spatial parameters to SRS transmissions based on when the network entity 105-*b* schedules the SRS transmissions.

It should be noted that the UEs 115 and the network entity 105 (e.g., a cell) may be any two wireless nodes performing half-duplex or full-duplex communications. For example, in an IAB wireless system, the network entity 105-*b* may be referred to as an IAB parent node and the UE 115-*b* may be referred to as an IAB MT, where an IAB DU may be referred to as a gNB (e.g., or a network entity 105). Alternatively, in the case of a wireless repeater system, the network entity 105-*b* may be referred to as a gNB, and the UE 115-*b* may be referred to as a repeater or mobile terminal component of a repeater communicating with the gNB. In such examples of IAB or repeater systems, two receive and transmit communication links at the UE 115 (or respective component) may be included in a same or different carrier components, cell groups, or radio access networks.

Figure 3:
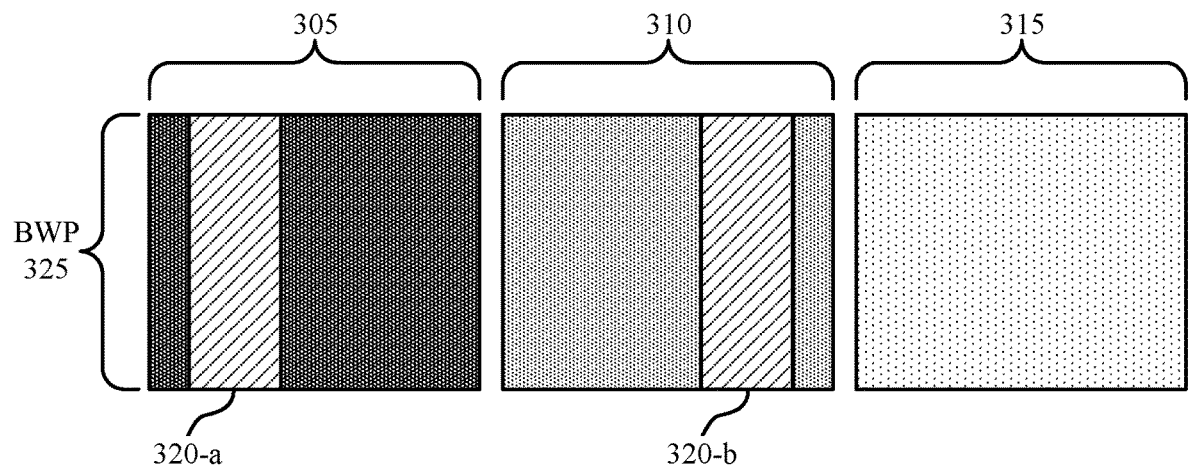
FIG. 3 illustrates an example of a resource configuration that supports spatial parameters for half-duplex and full-duplex communications in accordance with one or more aspects of the present disclosure.
Figure 3:
Figure 3:
Figure 3:
Figure 3:

FIG. 3 illustrates an example of a resource configuration 300 that supports spatial parameters for half-duplex and full-duplex communications in accordance with one or more aspects of the present disclosure. In some examples, the resource configuration 300 may implement aspects of the wireless communications systems 100 and 200 or may be implemented by aspects of the wireless communications systems 100 and 200. For example, a UE 115 (e.g., first wireless node) may transmit a configuration message to a network entity 105 (e.g., a second wireless node) indicating a spatial configuration. The spatial configuration may include a first set of spatial parameters for half-duplex communications between the first and second wireless nodes and a second set of spatial parameters for full-duplex communications between the first and second wireless nodes. In some cases, the UE 115 may apply the spatial configuration to the resource configuration 300 and communicate with the network entity 105 accordingly.

In some examples, the network entity 105 may indicate to the UE 115 (e.g., a transmitting or receiving device) whether to use one or more of the sets of spatial parameters for half-duplex or full-duplex communications. Such an indication may depend on whether the UE 115 is a receiving or transmitting device. For example, if the UE 115 is a receiving device, the UE 115 may receive downlink control transmissions (e.g., PDCCH) and downlink data transmissions (e.g., PDSCH), and perform channel measurement procedures, which may be associated with CSI, beam management, beam failure recovery (BFR) procedures, radio link management, inter-UE cross-link interference (CLI), mobility procedures, and the like. If the UE 115 is a transmitting device, the UE 115 may transmit uplink control transmissions (e.g., PUCCH), uplink data transmissions (e.g., PUSCH), uplink reference signal transmissions (e.g., SRS), or any combination thereof.

The UE 115 may implicitly determine which spatial configuration to use based on a rule. For example, the UE 115 may select one of the first set of spatial parameters or the second set of spatial parameters to use for the communicating with the network entity 105 based on whether one or more symbols are configured as half-duplex symbols or are configured as full-duplex symbols. For instance, in a bandwidth part 325, the resource configuration 300 may include downlink half-duplex symbols 305 (e.g., symbols configured for downlink half-duplex communications), uplink half-duplex symbols 315 (e.g., symbols configured for uplink half-duplex communications), and full-duplex symbols 310 (configured for downlink and uplink full-duplex communications). The UE 115 may implicitly select the first or second set of spatial parameters based on whether an occasion of an SPS, configured grant, or measurement reference signal (e.g., an SRS, a CSI-RS) is in a half- or full-duplex symbol. for example, if a CSI-RS 320-*a* used for measuring CSI is carried in the downlink half-duplex symbols 305, the UE 115 may select the first set of spatial parameters. Alternatively, if a CSI-RS 320-*b* used for measuring CSI is carried in the full-duplex symbols 310, the UE 115 may select the second set of spatial parameters.

Alternatively, the network entity 105 may send the UE 115 an explicit indication of which set of spatial parameters to use. The UE 115 may receive a control message indicating the first set of spatial parameters or the second set of spatial parameters. Based on the control message, the UE 115 may select one of the first set of spatial parameters or the second set of spatial parameters to use for the communicating with the network entity 105. For example, the network entity 105 may transmit an RRC configuration to the UE 115 for semi-persistent scheduling (SPS), a configured grant, or some measurement, or DCI or a MAC-CE triggering or activating aperiodic or semi-persistent PDSCH and PUSCH transmissions. In the example of FIG. 3, if the network entity 105 transmits the control message indicating that the UE 115 is to use the second set of parameters, the UE 115 may perform a PDSCH or PUSCH transmission via the full-duplex symbols 310.

In some examples, the network entity 105 may transmit a single DCI to the UE 115 scheduling multiple PDSCHs or multiple PUSCHs. In such cases, the DCI may also indicate separate sets of MIMO parameters for half-duplex and full-duplex communications between the UE 115 and the network entity 105. For example, in cases where communications between the UE 115 and the network entity 105 occur via a set of shared channels (e.g., PDSCHs or PUSCHs), the UE 115 may receive a control message scheduling the set of shared channels. The DCI may include the MIMO parameters when some of the multiple scheduled PDSCHs or PUSCHs are scheduled in downlink half-duplex symbols 305 or uplink half-duplex symbols 310, respectively, while the remaining scheduled PDSCHs or PUSCHs may be scheduled in the full-duplex symbols 310.

In such cases, the UE 115 may select to use the first set of spatial parameters or the second set of spatial parameters based on a rule. For example, for each shared channel of the set of shared channels, the UE 115 may select one of the first set of spatial parameters or the second set of spatial parameters to use for communicating via the shared channel based on whether the shared channel is scheduled for one or more half-duplex symbols or is scheduled for one or more full-duplex symbols 310. For instance, the UE 115 may select the first or second set of spatial parameters as well as a corresponding MIMO parameter set (indicated in the scheduling DCI) if the scheduled PDSCHs or PUSCHs are scheduled in the downlink half-duplex symbols 305, the uplink half-duplex symbols 315, or the full-duplex symbols 310. In this way, the PDSCHs or PUSCHs are scheduled in the downlink half-duplex symbols 305 or the uplink half-duplex symbols 315, the UE 115 may select the first set of spatial parameters, and if the PDSCHs or PUSCHs are scheduled in the flexible-duplex symbols 310, the UE 115 may select the second set of spatial parameters.

Alternatively, the network entity 105 may send the UE 115 and explicit indication of which set of spatial parameters to use. For cases in which communications between the UE 115 and the network entity 105 occur via a set of shared channels (e.g., PDSCHs or PUSCHs), the UE 115 may receive a control message scheduling the set of shared channels and indicating, for each of the set of shared channels, whether the UE 115 is to use the first set of spatial parameters or the second set of spatial parameters for the shared channel. For example, the UE 115 may receive DCI indicating each scheduled PDSCH or PUSCH and whether the UE 115 is to use the first set of spatial parameters or the second set of spatial parameters, as well as a corresponding MIMO parameter set, for communicating the scheduled PDSCHs or PUSCHs. Based on the control message and for each shared channel of the set of shared channels, the UE 115 may select one of the first set of spatial parameters or the second set of spatial parameters to use for communicating via the shared channel.

Figure 4:
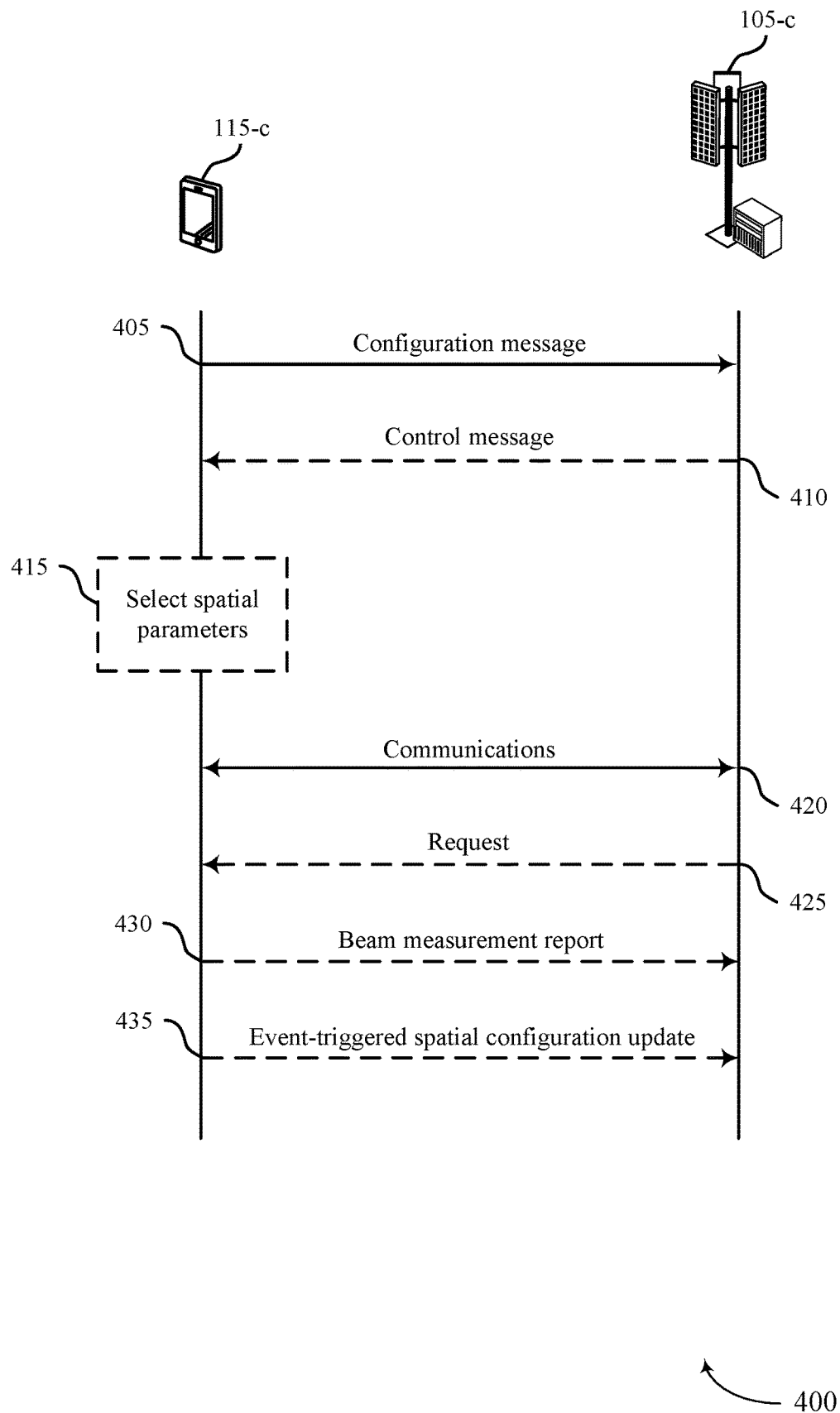
FIG. 4 illustrates an example of a process flow that supports spatial parameters for half-duplex and full-duplex communications in accordance with one or more aspects of the present disclosure.

FIG. 4 illustrates an example of a process flow 400 that supports spatial parameters for half-duplex and full-duplex communications in accordance with one or more aspects of the present disclosure. The process flow 400 may implement aspects of wireless communications systems 100 and 200, or may be implemented by aspects of the wireless communications systems 100 and 200. For example, the process flow 400 may illustrate operations between a UE 115-c and a network entity 105-c, which may be examples of corresponding devices described herein. In the following description of the process flow 400, the operations between the UE 115-c and the network entity 105-c may be transmitted in a different order than the example order shown, or the operations performed by the UE 115-c and the network entity 105-c may be performed in different orders or at different times. Some operations may also be omitted from the process flow 400, and other operations may be added to the process flow 400.

At 405, the UE 115-c (e.g., a first wireless node) may transmit, to the network entity 105-c, a configuration message indicating one or more spatial configurations for communications with the network entity 105-c (e.g., a second wireless node), where the one or more spatial configurations include a first set of spatial parameters associated with half-duplex communications with the network entity 105-c and a second set of spatial parameters associated with full-duplex communications with the network entity 105-c. In some cases, the UE 115-c may transmit the configuration message in an uplink grant or an uplink shared channel transmission. In addition, the second set of spatial parameters may include a MIMO parameter, a port parameter, a resource parameter, a TRP scheme parameter or any combination thereof associated with full-duplex communications, and may be associated with uplink transmissions or downlink transmissions.

At 410, the UE 115-c may receive, from the network entity 105-c, a control message indicating the first set of spatial parameters or the second set of spatial parameters. That is, the network entity 105-c may transmit an explicit indication of the first or second set of parameters. Alternatively, the control message may schedule a set of shared channels and indicate, for each shared channel, whether the UE 115-c is to use the first or second set of spatial parameters.

At 415, the UE 115-c may select one of the first set of spatial parameters or the second set of spatial parameters to use for the communicating with the network entity 105-c based on whether one or more symbols are configured as half-duplex symbols or are configured as full-duplex symbols, where the communications occur via the one or more symbols. In some cases, the UE 115-c may make the selection based on the control message (e.g., an explicit indication of one of the sets of parameters).

At 420, the UE 115-c may communicate with the network entity 105-c using the first set of spatial parameters or the second set of spatial parameters based on transmitting the configuration message. That is, the UE 115-c and the network entity 105-c may perform half-duplex or full-duplex communications using a corresponding set of spatial parameters.

At 425, the UE 115-c may receive, from the network entity 105-c, a request for a beam measurement report from the UE 115-c. In doing so, the network entity 105-c may trigger the UE 115-c to update the one or more spatial configurations.

At 430, the UE 115-c may transmit, to the network entity 105-c, the beam measurement report including respective sets of spatial parameters associated with full-duplex communications for given reference signals. The respective sets of spatial parameters may be updated based on the reference signals.

At 435, the UE 115-c may transmit, to the network entity 105-c, an event-triggered spatial configuration update. For example, based on receiving the request for the beam measurement report from the network entity 105-c and transmitting the report, the UE 115-c may transmit an indication of updated spatial configurations to the network entity 105-c.

Figure 5:
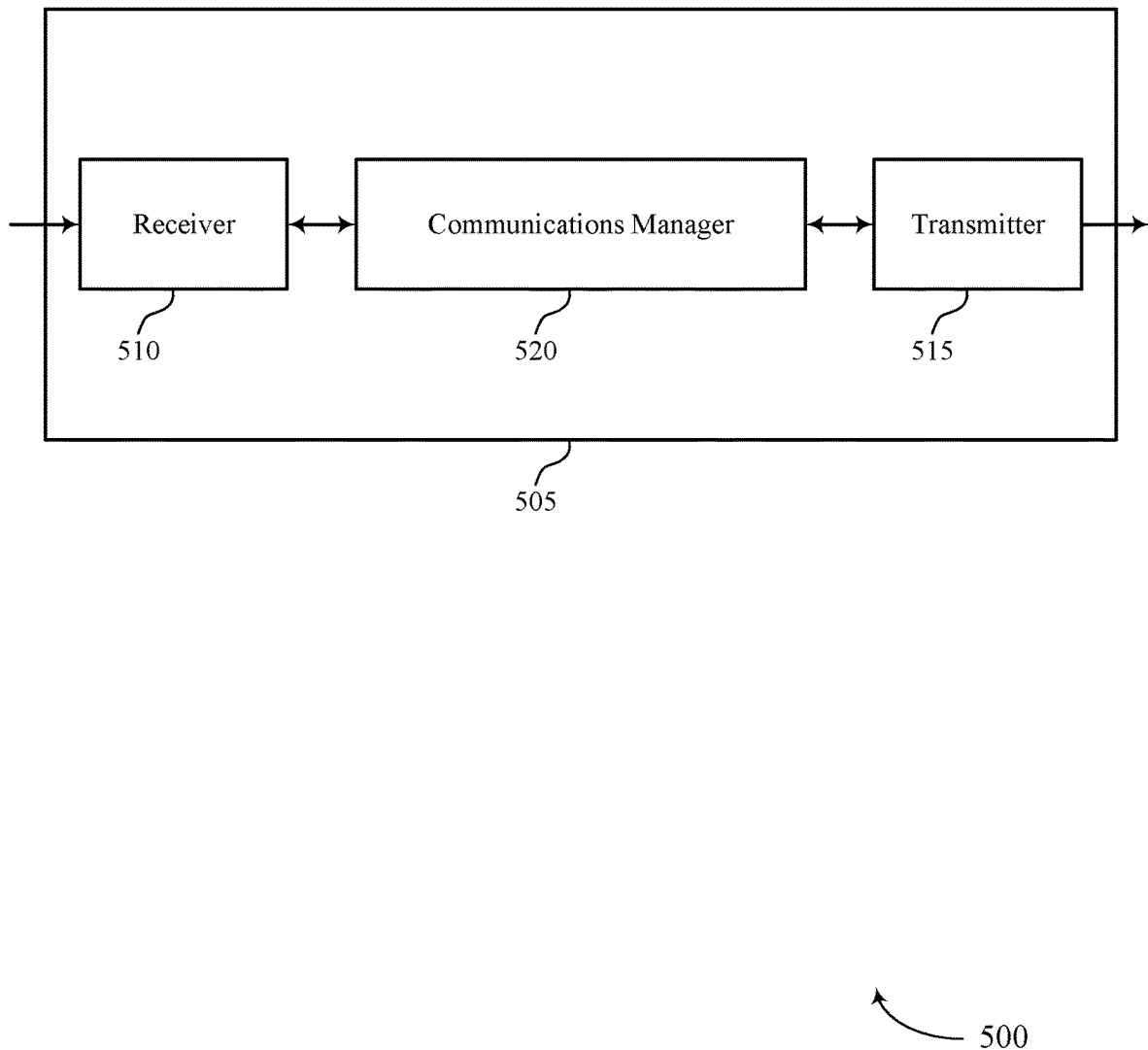
FIGS. 5 and 6 illustrate block diagrams of devices that support spatial parameters for half-duplex and full-duplex communications in accordance with one or more aspects of the present disclosure.

FIG. 5 illustrates a block diagram 500 of a device 505 that supports spatial parameters for half-duplex and full-duplex communications in accordance with one or more aspects of the present disclosure. The device 505 may be an example of aspects of a first wireless node as described herein. The device 505 may include a receiver 510, a transmitter 515, and a communications manager 520. The device 505 may also include a processor. Each of these components may be in communication with one another (e.g., via one or more buses).

The receiver 510 may provide a means for receiving information such as packets, user data, control information, or any combination thereof associated with various information channels (e.g., control channels, data channels, information channels related to spatial parameters for half-duplex and full-duplex communications). Information may be passed on to other components of the device 505. The receiver 510 may utilize a single antenna or a set of multiple antennas.

The transmitter 515 may provide a means for transmitting signals generated by other components of the device 505. For example, the transmitter 515 may transmit information such as packets, user data, control information, or any combination thereof associated with various information channels (e.g., control channels, data channels, information channels related to spatial parameters for half-duplex and full-duplex communications). In some examples, the transmitter 515 may be co-located with a receiver 510 in a transceiver module. The transmitter 515 may utilize a single antenna or a set of multiple antennas.

The communications manager 520, the receiver 510, the transmitter 515, or various combinations thereof or various components thereof may be examples of means for performing various aspects of spatial parameters for half-duplex and full-duplex communications as described herein. For example, the communications manager 520, the receiver 510, the transmitter 515, or various combinations or components thereof may support a method for performing one or more of the functions described herein.

In some examples, the communications manager 520, the receiver 510, the transmitter 515, or various combinations or components thereof may be implemented in hardware (e.g., in communications management circuitry). The hardware may include a processor, a DSP, a CPU, an ASIC, an FPGA or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 520, the receiver 510, the transmitter 515, or various combinations or components thereof may be implemented in code (e.g., as communications management software or firmware) executed by a processor. If implemented in code executed by a processor, the functions of the communications manager 520, the receiver 510, the transmitter 515, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 520 may be configured to perform various operations (e.g., receiving, obtaining, monitoring, outputting, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to obtain information, output information, or perform various other operations as described herein.

The communications manager 520 may support wireless communication in accordance with examples as disclosed herein. For example, the communications manager 520 may be configured as or otherwise support a means for transmitting, by a first wireless node, a configuration message indicating one or more spatial configurations for communications with a second wireless node, where the one or more spatial configurations include. In some examples, to, the communications manager 520 may be configured as or otherwise support a means for a first set of spatial parameters associated with half-duplex communications with the second wireless node and a second set of spatial parameters associated with full-duplex communications with the second wireless node. The communications manager 520 may be configured as or otherwise support a means for communicating, by the first wireless node, with the second wireless node using the first set of spatial parameters or the second set of spatial parameters based on transmitting the configuration message.

By including or configuring the communications manager 520 in accordance with examples as described herein, the device 505 (e.g., a processor controlling or otherwise coupled with the receiver 510, the transmitter 515, the communications manager 520, or a combination thereof) may support techniques for indicating separate spatial parameters for half-duplex and full-duplex communications, which may decrease overhead and latency and increase quality of communications between wireless nodes.

Figure 6:
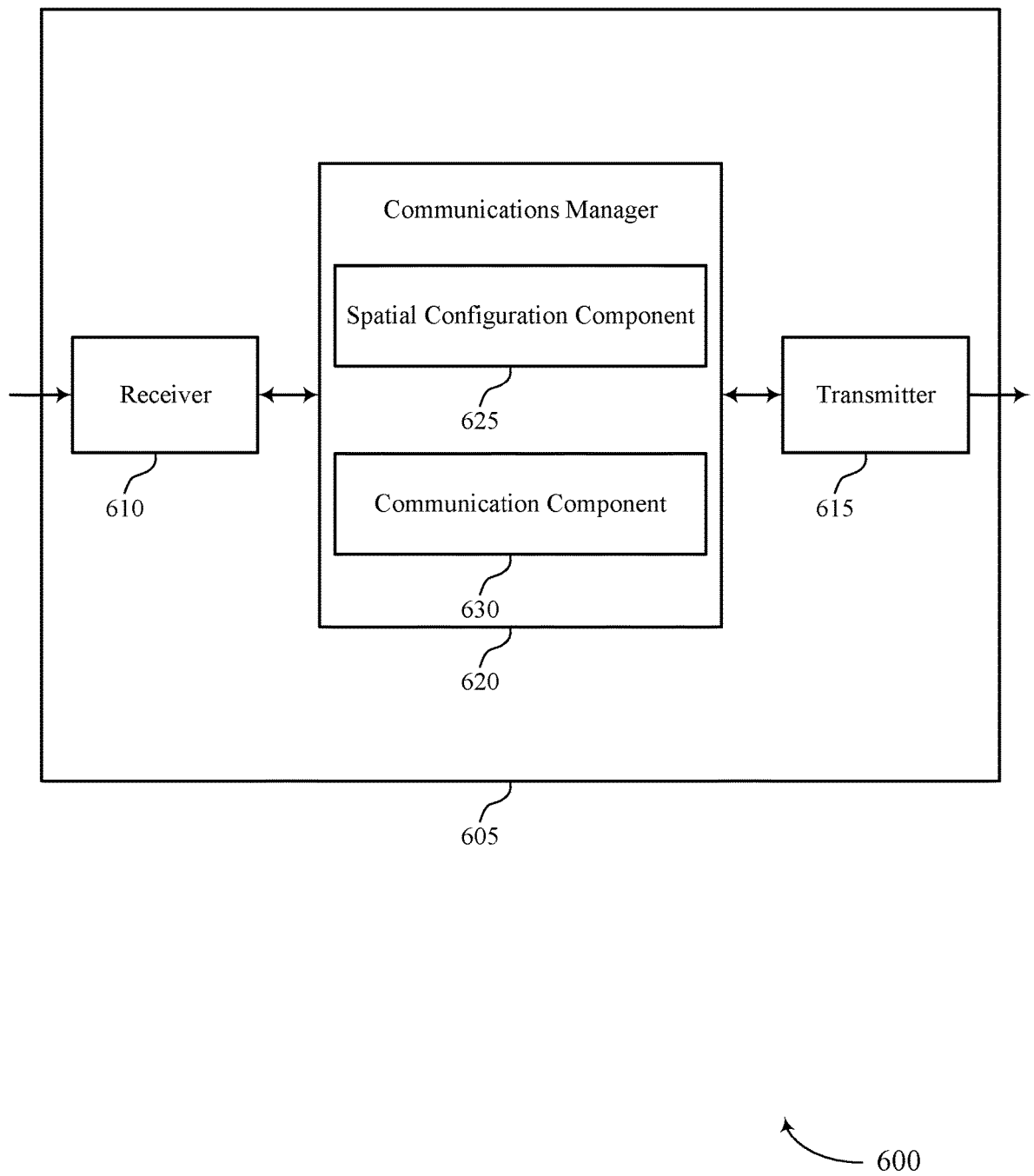

FIG. 6 illustrates a block diagram 600 of a device 605 that supports spatial parameters for half-duplex and full-duplex communications in accordance with one or more aspects of the present disclosure. The device 605 may be an example of aspects of a device 505 or a first wireless node 115 as described herein. The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to spatial parameters for half-duplex and full-duplex communications). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to spatial parameters for half-duplex and full-duplex communications). In some examples, the transmitter 615 may be co-located with a receiver 610 in a transceiver module. The transmitter 615 may utilize a single antenna or a set of multiple antennas.

The device 605, or various components thereof, may be an example of means for performing various aspects of spatial parameters for half-duplex and full-duplex communications as described herein. For example, the communications manager 620 may include a spatial configuration component 625 a communication component 630, or any combination thereof. The communications manager 620 may be an example of aspects of a communications manager 520 as described herein. In some examples, the communications manager 620, or various components thereof, may be configured to perform various operations (e.g., receiving, obtaining, monitoring, outputting, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to obtain information, output information, or perform various other operations as described herein.

The communications manager 620 may support wireless communication in accordance with examples as disclosed herein. The spatial configuration component 625 may be configured as or otherwise support a means for transmitting, by a first wireless node, a configuration message indicating one or more spatial configurations for communications with a second wireless node, where the one or more spatial configurations include. In some examples, to the spatial configuration component 625 may be configured as or otherwise support a means for a first set of spatial parameters associated with half-duplex communications with the second wireless node and the spatial configuration component 625 may be configured as or otherwise support a means for a second set of spatial parameters associated with full-duplex communications with the second wireless node. The communication component 630 may be configured as or otherwise support a means for communicating, by the first wireless node, with the second wireless node using the first set of spatial parameters or the second set of spatial parameters based on transmitting the configuration message.

Figure 7:
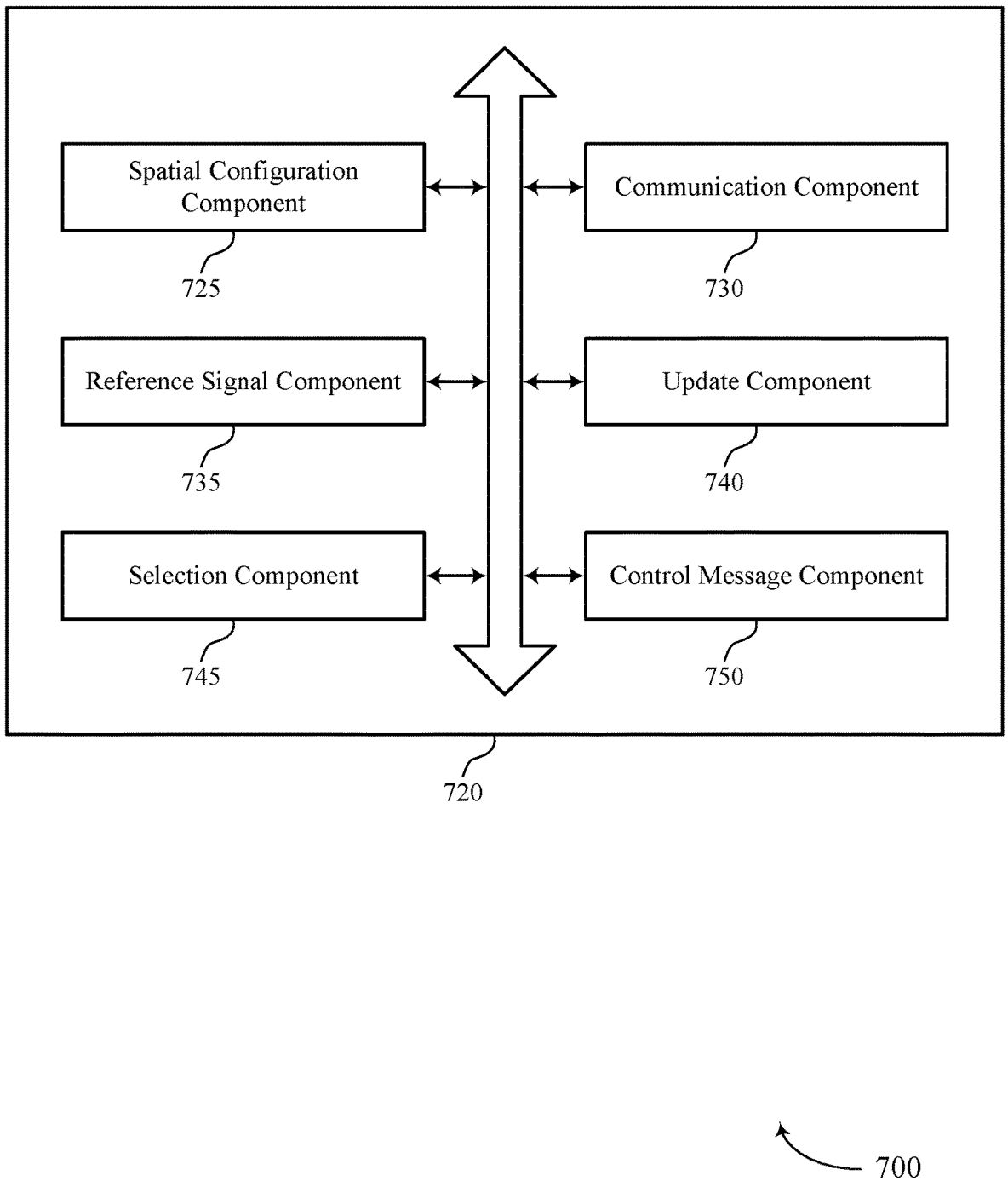
FIG. 7 illustrates a block diagram of a communications manager that supports spatial parameters for half-duplex and full-duplex communications in accordance with one or more aspects of the present disclosure.

FIG. 7 illustrates a block diagram 700 of a communications manager 720 that supports spatial parameters for half-duplex and full-duplex communications in accordance with one or more aspects of the present disclosure. The communications manager 720 may be an example of aspects of a communications manager 520, a communications manager 620, or both, as described herein. The communications manager 720, or various components thereof, may be an example of means for performing various aspects of spatial parameters for half-duplex and full-duplex communications as described herein. For example, the communications manager 720 may include a spatial configuration component 725, a communication component 730, a reference signal component 735, an update component 740, a selection component 745, a control message component 750, or any combination thereof. Each of these components may communicate, directly or indirectly, with one another (e.g., via one or more buses).

The communications manager 720 may support wireless communication in accordance with examples as disclosed herein. The spatial configuration component 725 may be configured as or otherwise support a means for transmitting, by a first wireless node, a configuration message indicating one or more spatial configurations for communications with a second wireless node, where the one or more spatial configurations include. In some examples, the spatial configuration component 725 may be configured as or otherwise support a means for a first set of spatial parameters associated with half-duplex communications with the second wireless node and the spatial configuration component 725 may be configured as or otherwise support a means for a second set of spatial parameters associated with full-duplex communications with the second wireless node. The communication component 730 may be configured as or otherwise support a means for communicating, by the first wireless node, with the second wireless node using the first set of spatial parameters or the second set of spatial parameters based on transmitting the configuration message.

In some examples, the first set of spatial parameters associated with the half-duplex communications with the second wireless node are associated with a first antenna configuration at the first wireless node or the second wireless node, and where the second set of spatial parameters associated with the full-duplex communications with the second wireless node are associated with a second antenna configuration at the first wireless node or the second wireless node.

In some examples, the configuration message indicates, for each reference signal of a set of multiple reference signals associated with a beam measurement report, a respective set of spatial parameters associated with full-duplex communications via a beam direction corresponding to the reference signal, and where the respective set of spatial parameters for one of the set of multiple reference signals includes the second set of spatial parameters.

In some examples, the update component 740 may be configured as or otherwise support a means for identifying an update to a prior set of spatial parameters associated with the full-duplex communications with the second wireless node, where the second set of spatial parameters is based on the update to the prior set of spatial parameters, and where transmitting the configuration message including the one or more spatial configurations is based on identifying the update.

In some examples, to support transmitting the configuration message, the update component 740 may be configured as or otherwise support a means for transmitting an uplink grant obtained via a scheduling request or an uplink shared channel transmission including the configuration message.

In some examples, the configuration message indicates a respective set of downlink spatial parameters, a respective set of uplink spatial parameters, or both for each reference signal of a set of multiple reference signals.

In some examples, the communicating with the second wireless node occurs via one or more symbols, and the selection component 745 may be configured as or otherwise support a means for selecting one of the first set of spatial parameters or the second set of spatial parameters to use for the communicating with the second wireless node based on whether the one or more symbols are configured as half-duplex symbols or are configured as full-duplex symbols.

In some examples, the control message component 750 may be configured as or otherwise support a means for receiving a control message indicating the first set of spatial parameters or the second set of spatial parameters. In some examples, the selection component 745 may be configured as or otherwise support a means for selecting one of the first set of spatial parameters or the second set of spatial parameters to use for the communicating with the second wireless node based on the control message.

In some examples, the communicating with the second wireless node occurs via a set of multiple shared channels including a set of multiple downlink shared channels or a set of multiple uplink shared channels, and the control message component 750 may be configured as or otherwise support a means for receiving a control message scheduling the set of multiple shared channels. In some examples, the communicating with the second wireless node occurs via a set of multiple shared channels including a set of multiple downlink shared channels or a set of multiple uplink shared channels, and the selection component 745 may be configured as or otherwise support a means for selecting, for each shared channel of the set of multiple shared channels, one of the first set of spatial parameters or the second set of spatial parameters to use for communicating via the shared channel based on whether the shared channel is scheduled for one or more half-duplex symbols or is scheduled for one or more full-duplex symbols.

In some examples, the communicating with the second wireless node occurs via a set of multiple shared channels including a set of multiple downlink shared channels or a set of multiple uplink shared channels, and the control message component 750 may be configured as or otherwise support a means for receiving a control message scheduling the set of multiple shared channels and indicating, for each of the set of multiple shared channels, whether the first wireless node is to use the first set of spatial parameters or the second set of spatial parameters for the shared channel. In some examples, the communicating with the second wireless node occurs via a set of multiple shared channels including a set of multiple downlink shared channels or a set of multiple uplink shared channels, and the selection component 745 may be configured as or otherwise support a means for selecting, for each shared channel of the set of multiple shared channels, one of the first set of spatial parameters or the second set of spatial parameters to use for communicating via the shared channel based on the control message.

In some examples, the second set of spatial parameters includes a multiple-input multiple-output parameter, a port parameter, a resource parameter, a transmission-reception point scheme parameter, or any combination thereof associated with the full-duplex communications with the second wireless node, and where the second set of spatial parameters is associated with uplink transmissions or downlink transmissions.

Figure 8:
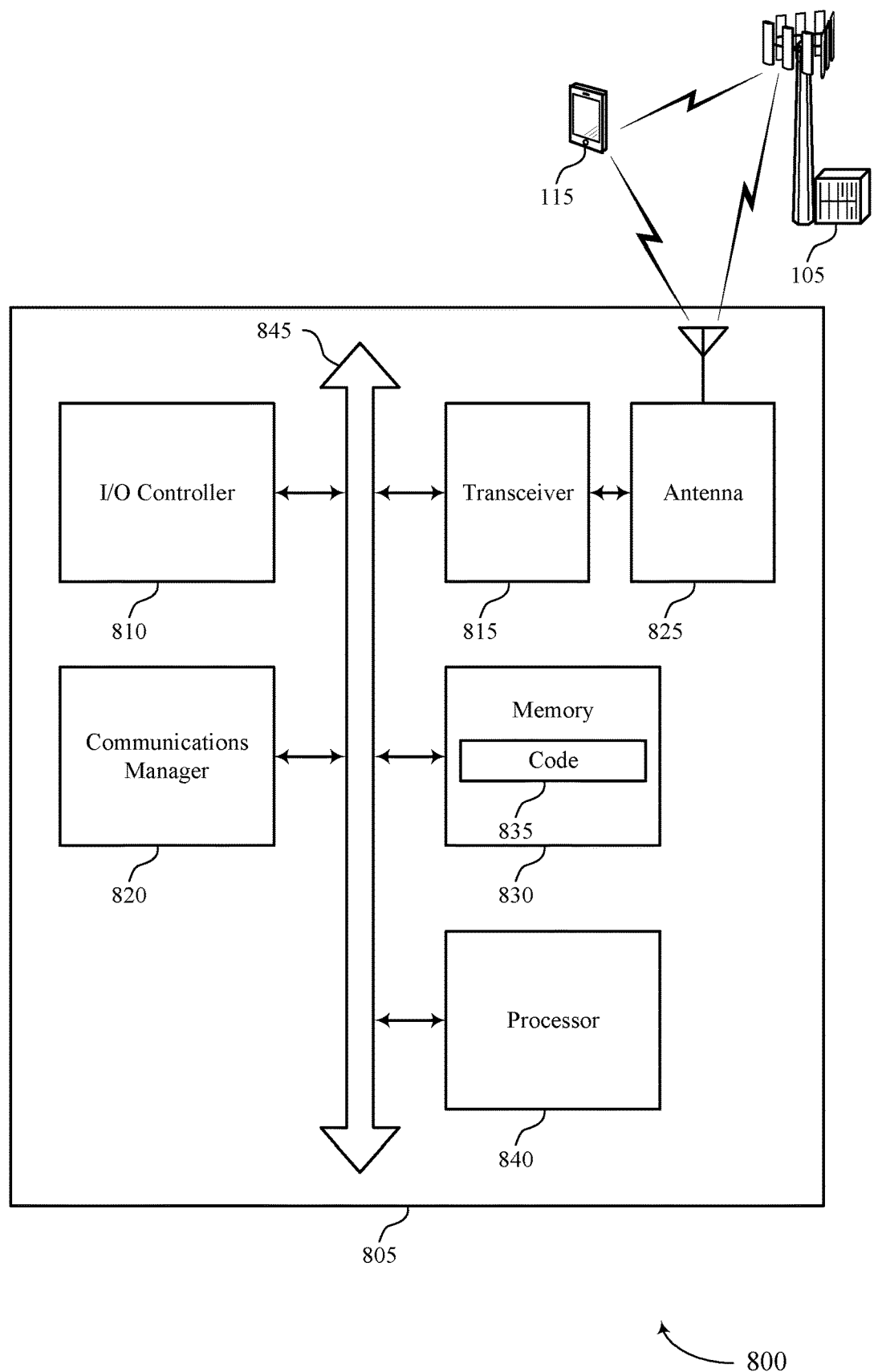
FIG. 8 illustrates a diagram of a system including a device that supports spatial parameters for half-duplex and full-duplex communications in accordance with one or more aspects of the present disclosure.

FIG. 8 illustrates a diagram of a system 800 including a device 805 that supports spatial parameters for half-duplex and full-duplex communications in accordance with one or more aspects of the present disclosure. The device 805 may be an example of or include the components of a device 505, a device 605, or a first wireless node as described herein. The device 805 may include components for bi-directional voice and data communications including components for transmitting and receiving communications, such as a communications manager 820, an I/O controller 810, a transceiver 815, an antenna 825, a memory 830, code 835, and a processor 840. These components may be in electronic communication or otherwise coupled (e.g., operatively, communicatively, functionally, electronically, electrically) via one or more buses (e.g., a bus 845).

The I/O controller 810 may manage input and output signals for the device 805. The I/O controller 810 may also manage peripherals not integrated into the device 805. In some cases, the I/O controller 810 may represent a physical connection or port to an external peripheral. In some cases, the I/O controller 810 may utilize an operating system such as iOS®, ANDROID®, MS-DOS®, MS-WINDOWS®, OS/2®, UNIX®, LINUX®, or another known operating system. Additionally, or alternatively, the I/O controller 810 may represent or interact with a modem, a keyboard, a mouse, a touchscreen, or a similar device. In some cases, the I/O controller 810 may be implemented as part of a processor, such as the processor 840. In some cases, a user may interact with the device 805 via the I/O controller 810 or via hardware components controlled by the I/O controller 810.

In some cases, the device 805 may include a single antenna 825. However, in some other cases, the device 805 may have more than one antenna 825, which may be capable of concurrently transmitting or receiving multiple wireless transmissions. The transceiver 815 may communicate bi-directionally, via the one or more antennas 825, wired, or wireless links as described herein. For example, the transceiver 815 may represent a wireless transceiver and may communicate bi-directionally with another wireless transceiver. The transceiver 815 may also include a modem to modulate the packets, to provide the modulated packets to one or more antennas 825 for transmission, and to demodulate packets received from the one or more antennas 825. The transceiver 815, or the transceiver 815 and one or more antennas 825, may be an example of a transmitter 515, a transmitter 615, a receiver 510, a receiver 610, or any combination thereof or component thereof, as described herein.

The memory 830 may include RAM and ROM. The memory 830 may store computer-readable, computer-executable code 835 including instructions that, when executed by the processor 840, cause the device 805 to perform various functions described herein. The code 835 may be stored in a non-transitory computer-readable medium such as system memory or another type of memory. In some cases, the code 835 may not be directly executable by the processor 840 but may cause a computer (e.g., when compiled and executed) to perform functions described herein. In some cases, the memory 830 may contain, among other things, a BIOS which may control basic hardware or software operation such as the interaction with peripheral components or devices.

The processor 840 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 840 may be configured to operate a memory array using a memory controller. In some other cases, a memory controller may be integrated into the processor 840. The processor 840 may be configured to execute computer-readable instructions stored in a memory (e.g., the memory 830) to cause the device 805 to perform various functions (e.g., functions or tasks supporting spatial parameters for half-duplex and full-duplex communications). For example, the device 805 or a component of the device 805 may include a processor 840 and memory 830 coupled with or to the processor 840, the processor 840 and memory 830 configured to perform various functions described herein.

The communications manager 820 may support wireless communication in accordance with examples as disclosed herein. For example, the communications manager 820 may be configured as or otherwise support a means for transmitting, by a first wireless node, a configuration message indicating one or more spatial configurations for communications with a second wireless node, where the one or more spatial configurations include. In some examples, to, the communications manager 820 may be configured as or otherwise support a means for a first set of spatial parameters associated with half-duplex communications with the second wireless node and a second set of spatial parameters associated with full-duplex communications with the second wireless node. The communications manager 820 may be configured as or otherwise support a means for communicating, by the first wireless node, with the second wireless node using the first set of spatial parameters or the second set of spatial parameters based on transmitting the configuration message.

By including or configuring the communications manager 820 in accordance with examples as described herein, the device 805 may support techniques for indicating separate spatial parameters for half-duplex and full-duplex communications, which may decrease overhead and latency and increase quality of communications between wireless nodes.

In some examples, the communications manager 820 may be configured to perform various operations (e.g., receiving, monitoring, transmitting) using or otherwise in cooperation with the transceiver 815, the one or more antennas 825, or any combination thereof. Although the communications manager 820 is illustrated as a separate component, in some examples, one or more functions described with reference to the communications manager 820 may be supported by or performed by the processor 840, the memory 830, the code 835, or any combination thereof. For example, the code 835 may include instructions executable by the processor 840 to cause the device 805 to perform various aspects of spatial parameters for half-duplex and full-duplex communications as described herein, or the processor 840 and the memory 830 may be otherwise configured to perform or support such operations.

Figure 9:
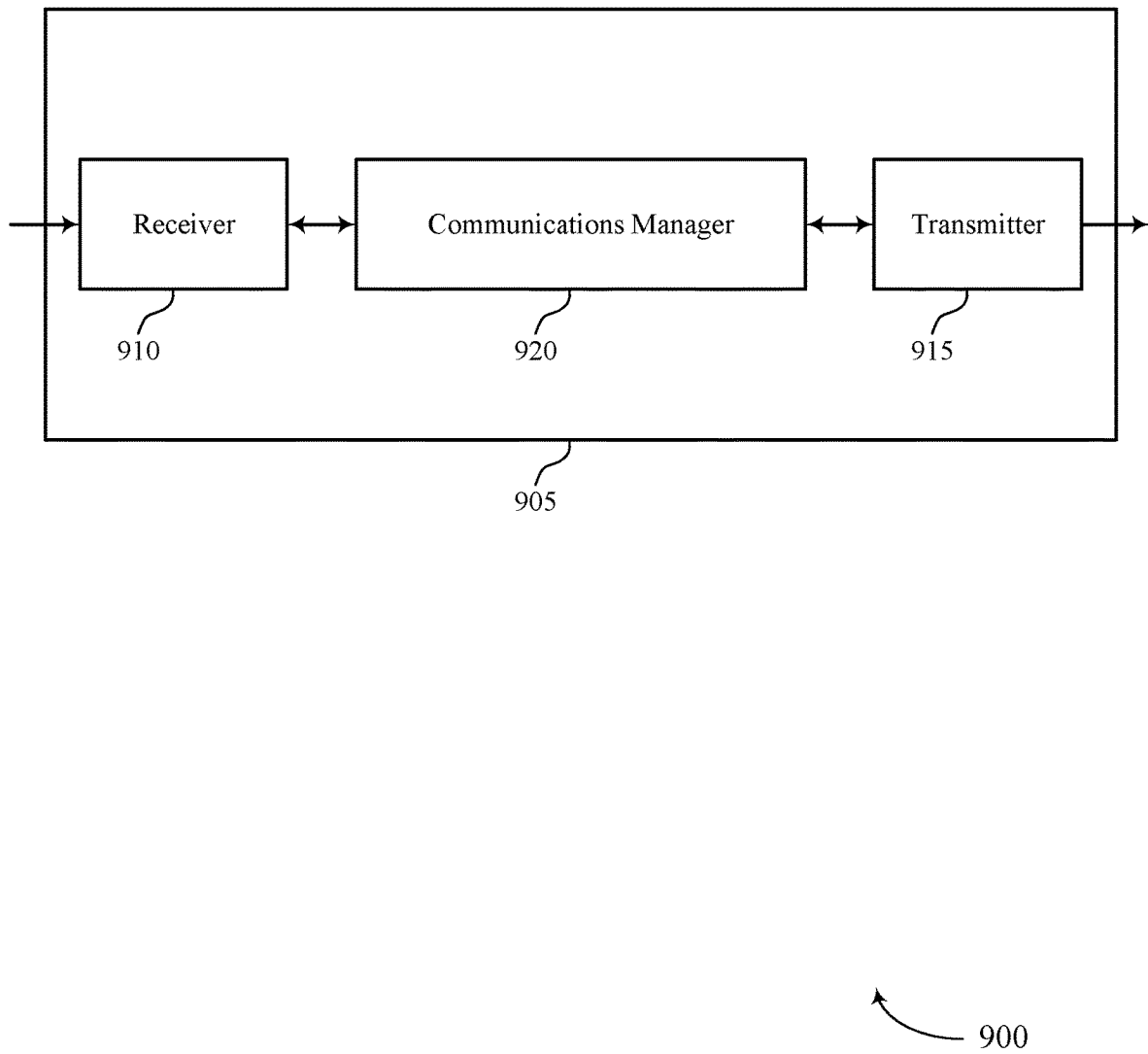
FIGS. 9 and 10 illustrate block diagrams of devices that support spatial parameters for half-duplex and full-duplex communications in accordance with one or more aspects of the present disclosure.

FIG. 9 illustrates a block diagram 900 of a device 905 that supports spatial parameters for half-duplex and full-duplex communications in accordance with one or more aspects of the present disclosure. The device 905 may be an example of aspects of a second wireless node as described herein. The device 905 may include a receiver 910, a transmitter 915, and a communications manager 920. The device 905 may also include a processor. Each of these components may be in communication with one another (e.g., via one or more buses).

The receiver 910 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 905. In some examples, the receiver 910 may support obtaining information by receiving signals via one or more antennas. Additionally, or alternatively, the receiver 910 may support obtaining information by receiving signals via one or more wired (e.g., electrical, fiber optic) interfaces, wireless interfaces, or any combination thereof.

The transmitter 915 may provide a means for outputting (e.g., transmitting, providing, conveying, sending) information generated by other components of the device 905. For example, the transmitter 915 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 915 may support outputting information by transmitting signals via one or more antennas. Additionally, or alternatively, the transmitter 915 may support outputting information by transmitting signals via one or more wired (e.g., electrical, fiber optic) interfaces, wireless interfaces, or any combination thereof. In some examples, the transmitter 915 and the receiver 910 may be co-located in a transceiver, which may include or be coupled with a modem.

The communications manager 920, the receiver 910, the transmitter 915, or various combinations thereof or various components thereof may be examples of means for performing various aspects of spatial parameters for half-duplex and full-duplex communications as described herein. For example, the communications manager 920, the receiver 910, the transmitter 915, or various combinations or components thereof may support a method for performing one or more of the functions described herein.

In some examples, the communications manager 920, the receiver 910, the transmitter 915, or various combinations or components thereof may be implemented in hardware (e.g., in communications management circuitry). The hardware may include a processor, a DSP, a CPU, an ASIC, an FPGA or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 920, the receiver 910, the transmitter 915, or various combinations or components thereof may be implemented in code (e.g., as communications management software or firmware) executed by a processor. If implemented in code executed by a processor, the functions of the communications manager 920, the receiver 910, the transmitter 915, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 920 may be configured to perform various operations (e.g., receiving, obtaining, monitoring, outputting, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to obtain information, output information, or perform various other operations as described herein.

The communications manager 920 may support wireless communication in accordance with examples as disclosed herein. For example, the communications manager 920 may be configured as or otherwise support a means for receiving, from a first wireless node at a second wireless node, a configuration message indicating one or more spatial configurations for communications between the first wireless node and the second wireless node, where the one or more spatial configurations include. In some examples, to, the communications manager 920 may be configured as or otherwise support a means for a first set of spatial parameters associated with half-duplex communications with the second wireless node and a second set of spatial parameters associated with full-duplex communications with the second wireless node. The communications manager 920 may be configured as or otherwise support a means for communicating, by the second wireless node, with the first wireless node using the first set of spatial parameters or the second set of spatial parameters based on receiving the configuration message.

By including or configuring the communications manager 920 in accordance with examples as described herein, the device 905 (e.g., a processor controlling or otherwise coupled with the receiver 910, the transmitter 915, the communications manager 920, or a combination thereof) may support techniques for indicating separate spatial parameters for half-duplex and full-duplex communications, which may decrease overhead and latency and increase quality of communications between wireless nodes.

Figure 10:
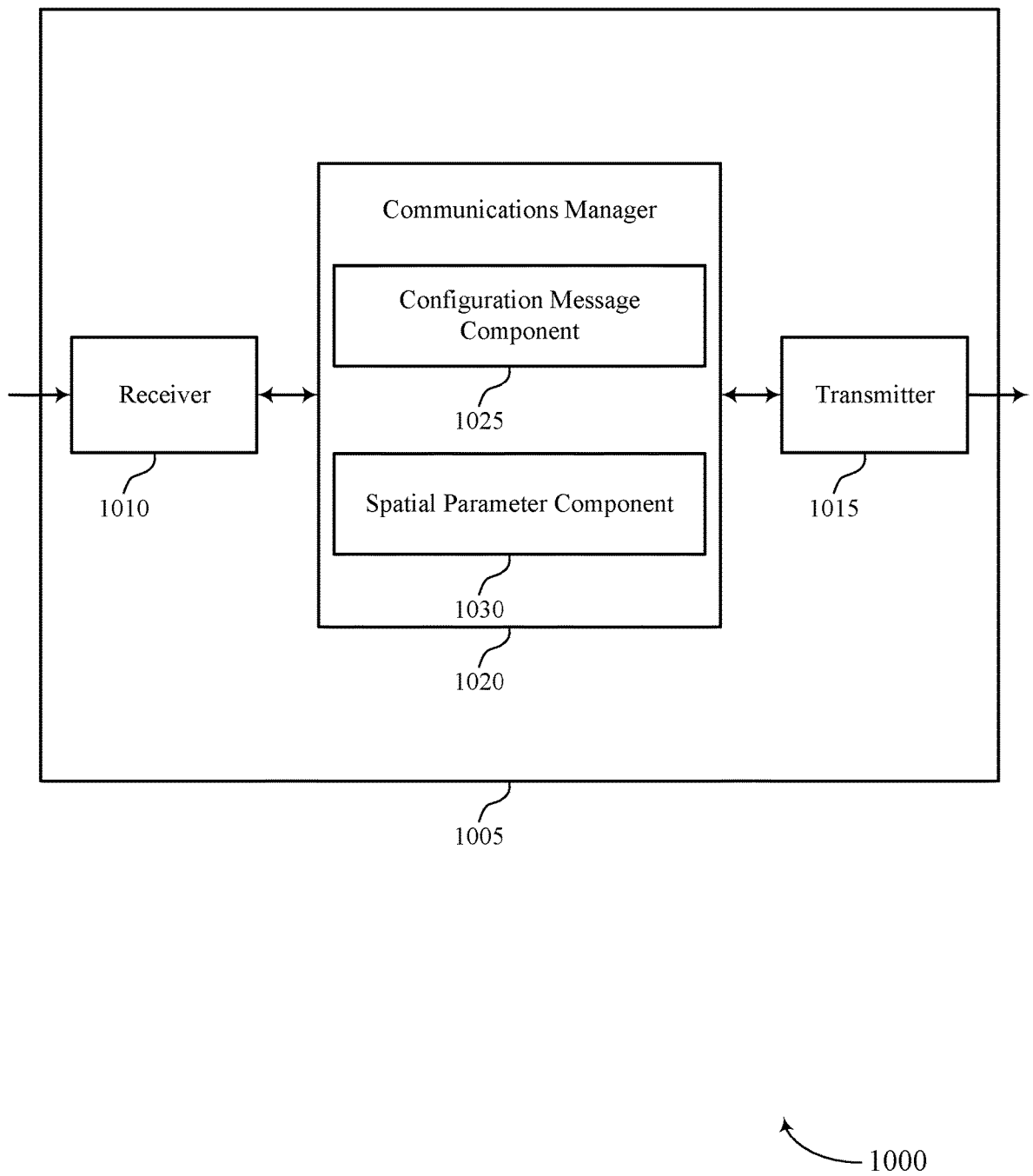

FIG. 10 illustrates a block diagram 1000 of a device 1005 that supports spatial parameters for half-duplex and full-duplex communications in accordance with one or more aspects of the present disclosure. The device 1005 may be an example of aspects of a device 905 or a second wireless node 115 as described herein. The device 1005 may include a receiver 1010, a transmitter 1015, and a communications manager 1020. The device 1005 may also include a processor. Each of these components may be in communication with one another (e.g., via one or more buses).

The receiver 1010 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1005. In some examples, the receiver 1010 may support obtaining information by receiving signals via one or more antennas. Additionally, or alternatively, the receiver 1010 may support obtaining information by receiving signals via one or more wired (e.g., electrical, fiber optic) interfaces, wireless interfaces, or any combination thereof.

The transmitter 1015 may provide a means for outputting (e.g., transmitting, providing, conveying, sending) information generated by other components of the device 1005. For example, the transmitter 1015 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1015 may support outputting information by transmitting signals via one or more antennas. Additionally, or alternatively, the transmitter 1015 may support outputting information by transmitting signals via one or more wired (e.g., electrical, fiber optic) interfaces, wireless interfaces, or any combination thereof. In some examples, the transmitter 1015 and the receiver 1010 may be co-located in a transceiver, which may include or be coupled with a modem.

The device 1005, or various components thereof, may be an example of means for performing various aspects of spatial parameters for half-duplex and full-duplex communications as described herein. For example, the communications manager 1020 may include a configuration message component 1025 a spatial parameter component 1030, or any combination thereof. The communications manager 1020 may be an example of aspects of a communications manager 920 as described herein. In some examples, the communications manager 1020, or various components thereof, may be configured to perform various operations (e.g., receiving, obtaining, monitoring, outputting, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to obtain information, output information, or perform various other operations as described herein.

The communications manager 1020 may support wireless communication in accordance with examples as disclosed herein. The configuration message component 1025 may be configured as or otherwise support a means for receiving, from a first wireless node at a second wireless node, a configuration message indicating one or more spatial configurations for communications between the first wireless node and the second wireless node, where the one or more spatial configurations include. In some examples, to, the configuration message component 1025 may be configured as or otherwise support a means for a first set of spatial parameters associated with half-duplex communications with the second wireless node and the configuration message component 1025 may be configured as or otherwise support a means for a second set of spatial parameters associated with full-duplex communications with the second wireless node. The spatial parameter component 1030 may be configured as or otherwise support a means for communicating, by the second wireless node, with the first wireless node using the first set of spatial parameters or the second set of spatial parameters based on receiving the configuration message.

Figure 11:
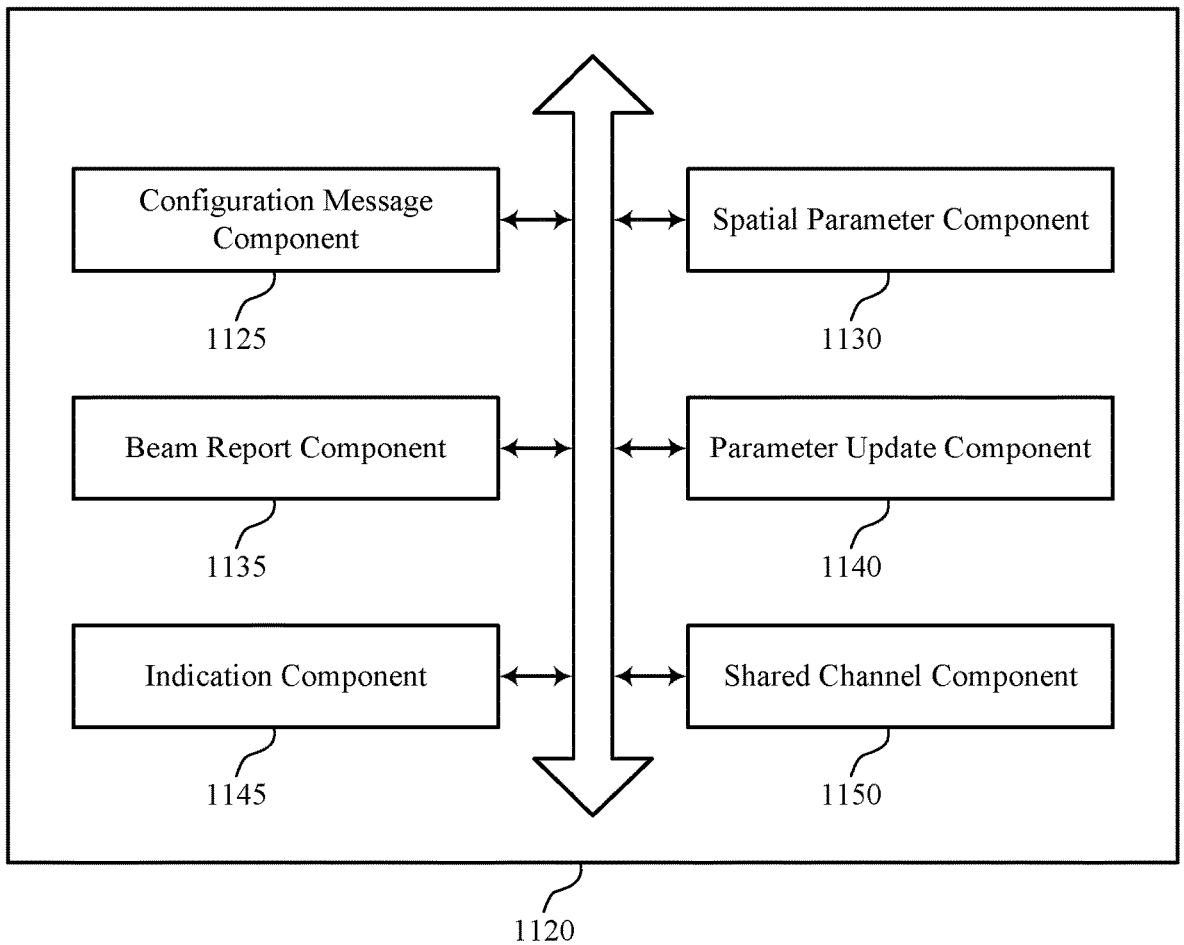
FIG. 11 illustrates a block diagram of a communications manager that supports spatial parameters for half-duplex and full-duplex communications in accordance with one or more aspects of the present disclosure.

FIG. 11 illustrates a block diagram 1100 of a communications manager 1120 that supports spatial parameters for half-duplex and full-duplex communications in accordance with one or more aspects of the present disclosure. The communications manager 1120 may be an example of aspects of a communications manager 920, a communications manager 1020, or both, as described herein. The communications manager 1120, or various components thereof, may be an example of means for performing various aspects of spatial parameters for half-duplex and full-duplex communications as described herein. For example, the communications manager 1120 may include a configuration message component 1125, a spatial parameter component 1130, a beam measurement report component 1135, a parameter update component 1140, an indication component 1145, a shared channel component 1150, or any combination thereof. Each of these components may communicate, directly or indirectly, with one another (e.g., via one or more buses).

The communications manager 1120 may support wireless communication in accordance with examples as disclosed herein. The configuration message component 1125 may be configured as or otherwise support a means for receiving, from a first wireless node at a second wireless node, a configuration message indicating one or more spatial configurations for communications between the first wireless node and the second wireless node, where the one or more spatial configurations include. In some examples, the configuration message component 1125 may be configured as or otherwise support a means for a first set of spatial parameters associated with half-duplex communications with the second wireless node and the configuration message component 1125 may be configured as or otherwise support a means for a second set of spatial parameters associated with full-duplex communications with the second wireless node. The spatial parameter component 1130 may be configured as or otherwise support a means for communicating, by the second wireless node, with the first wireless node using the first set of spatial parameters or the second set of spatial parameters based on receiving the configuration message.

In some examples, the first set of spatial parameters associated with the half-duplex communications with the second wireless node are associated with a first antenna configuration at the first wireless node or the second wireless node, and where the second set of spatial parameters associated with the full-duplex communications with the second wireless node are associated with a second antenna configuration at the first wireless node or the second wireless node.

In some examples, the configuration message indicates, for each reference signal of a set of multiple reference signals associated with a beam measurement report, a respective set of spatial parameters associated with full-duplex communications via a beam direction corresponding to the reference signal, and where the respective set of spatial parameters for one of the set of multiple reference signals includes the second set of spatial parameters.

In some examples, receiving the configuration message is based on an update to a prior set of spatial parameters associated with the full-duplex communications between the first wireless node and the second wireless node, and where the second set of spatial parameters is based on the update to the prior set of spatial parameters.

In some examples, to support receiving the configuration message, the configuration message component 1125 may be configured as or otherwise support a means for receiving an uplink grant obtained via a scheduling request or an uplink shared channel transmission including the configuration message.

In some examples, the configuration message indicates a respective set of downlink spatial parameters, a respective set of uplink spatial parameters, or both for each reference signal of a set of multiple reference signals.

In some examples, the communicating with the first wireless node occurs via one or more symbols, and the spatial parameter component 1130 may be configured as or otherwise support a means for identifying one of the first set of spatial parameters or the second set of spatial parameters for the communicating with the second wireless node based on whether the one or more symbols are configured as half-duplex symbols or are configured as full-duplex symbols.

In some examples, the indication component 1145 may be configured as or otherwise support a means for transmitting a control message indicating the first set of spatial parameters or the second set of spatial parameters, where the communicating with the first wireless node is based on the indicated one of the first set of spatial parameters or the second set of spatial parameters.

In some examples, the communicating with the first wireless node occurs via a set of multiple shared channels including a set of multiple downlink shared channels or a set of multiple uplink shared channels, and the shared channel component 1150 may be configured as or otherwise support a means for transmitting a control message scheduling the set of multiple shared channels, where, for each shared channel of the set of multiple shared channels, whether the first set of spatial parameters or the second set of spatial parameters is used for communicating via the shared channel is based on whether the shared channel is scheduled for one or more half-duplex symbols or is scheduled for one or more full-duplex symbols.

In some examples, the communicating with the first wireless node occurs via a set of multiple shared channels including a set of multiple downlink shared channels or a set of multiple uplink shared channels, and the shared channel component 1150 may be configured as or otherwise support a means for transmitting a control message scheduling the set of multiple shared channels and indicating, for each of the set of multiple shared channels, whether the first wireless node is to use the first set of spatial parameters or the second set of spatial parameters, where for each shared channel of the set of multiple shared channels, the indicated one of the first set of spatial parameters or the second set of spatial parameters is used for communicating via the shared channel.

In some examples, the second set of spatial parameters includes a multiple-input multiple-output parameter, a port parameter, a resource parameter, a transmission-reception point scheme parameter, or any combination thereof associated with the full-duplex communications with the second wireless node, and where the second set of spatial parameters is associated with uplink transmissions or downlink transmissions.

Figure 12:
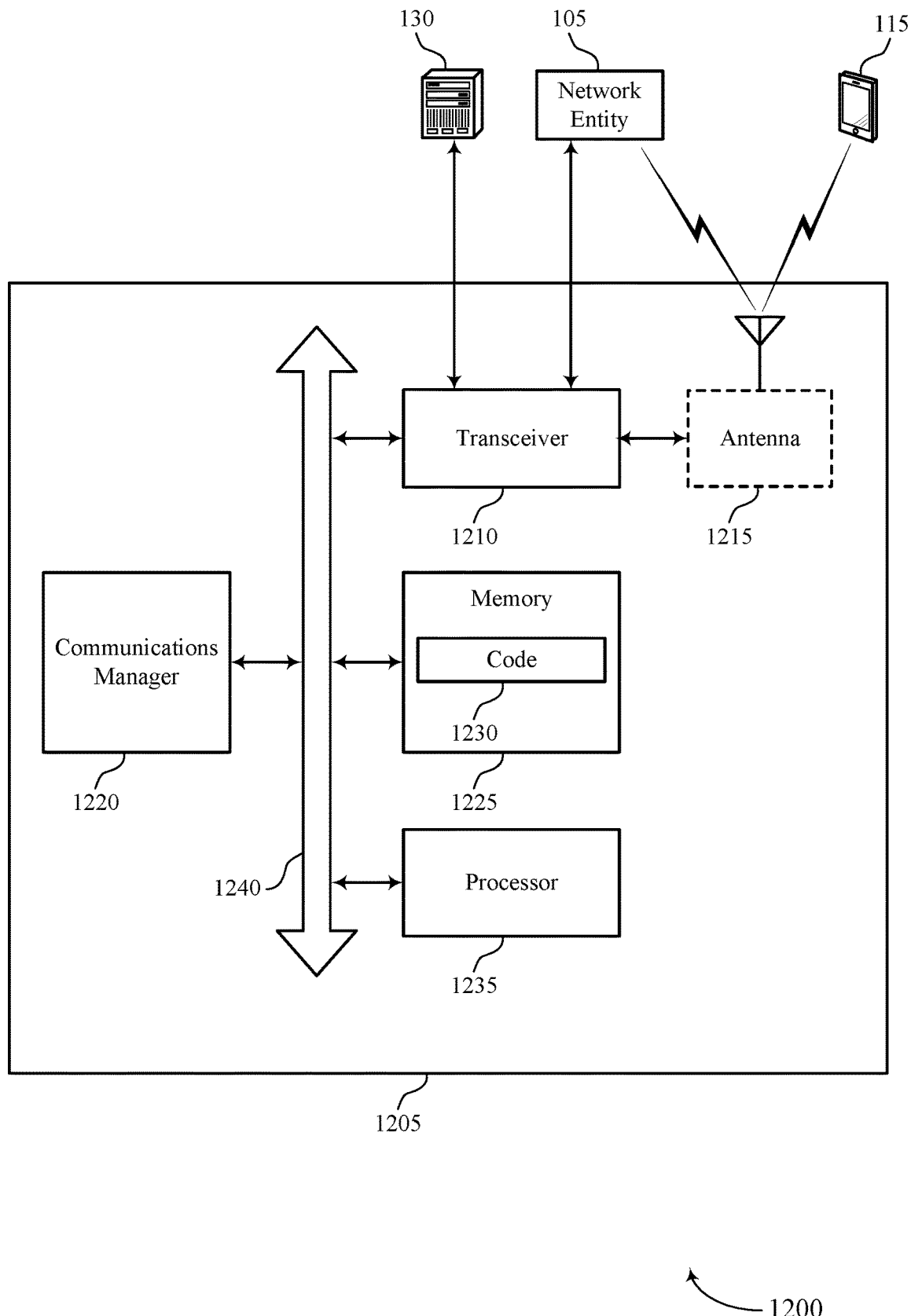
FIG. 12 illustrates a diagram of a system including a device that supports spatial parameters for half-duplex and full-duplex communications in accordance with one or more aspects of the present disclosure.

FIG. 12 illustrates a diagram of a system 1200 including a device 1205 that supports spatial parameters for half-duplex and full-duplex communications in accordance with one or more aspects of the present disclosure. The device 1205 may be an example of or include the components of a device 905, a device 1005, or a second wireless node as described herein. The device 1205 may include components for bi-directional voice and data communications including components for transmitting and receiving communications, such as a communications manager 1220, a transceiver 1210, an antenna 1215, a memory 1225, code 1230, and a processor 1235. These components may be in electronic communication or otherwise coupled (e.g., operatively, communicatively, functionally, electronically, electrically) via one or more buses (e.g., a bus 1240).

The transceiver 1210 may support bi-directional communications via wired links, wireless links, or both as described herein. In some examples, the transceiver 1210 may include a wired transceiver and may communicate bi-directionally with another wired transceiver. Additionally, or alternatively, in some examples, the transceiver 1210 may include a wireless transceiver and may communicate bi-directionally with another wireless transceiver. In some examples, the device 1205 may include one or more antennas 1215, which may be capable of transmitting or receiving wireless transmissions (e.g., concurrently). The transceiver 1210 may also include a modem to modulate signals, to provide the modulated signals for transmission (e.g., by one or more antennas 1215, by a wired transmitter), to receive modulated signals (e.g., from one or more antennas 1215, from a wired receiver), and to demodulate signals. In some implementations, the transceiver 1210 may include one or more interfaces, such as one or more interfaces coupled with the one or more antennas 1215 that are configured to support various receiving or obtaining operations, or one or more interfaces coupled with the one or more antennas 1215 that are configured to support various transmitting or outputting operations, or a combination thereof. In some implementations, the transceiver 1210 may include or be configured for coupling with one or more processors or memory components that are operable to perform or support operations based on received or obtained information or signals, or to generate information or other signals for transmission or other outputting, or any combination thereof. In some implementations, the transceiver 1210, or the transceiver 1210 and the one or more antennas 1215, or the transceiver 1210 and the one or more antennas 1215 and one or more processors or memory components (for example, the processor 1235, or the memory 1225, or both), may be included in a chip or chip assembly that is installed in the device 1205. In some examples, the transceiver may be operable to support communications via one or more communications links (e.g., a communication link 125, a backhaul communication link 120, a midhaul communication link 162, a fronthaul communication link 168).

The memory 1225 may include RAM and ROM. The memory 1225 may store computer-readable, computer-executable code 1230 including instructions that, when executed by the processor 1235, cause the device 1205 to perform various functions described herein. The code 1230 may be stored in a non-transitory computer-readable medium such as system memory or another type of memory. In some cases, the code 1230 may not be directly executable by the processor 1235 but may cause a computer (e.g., when compiled and executed) to perform functions described herein. In some cases, the memory 1225 may contain, among other things, a BIOS which may control basic hardware or software operation such as the interaction with peripheral components or devices.

The processor 1235 may include an intelligent hardware device (e.g., a general-purpose processor, a DSP, an ASIC, a CPU, an FPGA, a microcontroller, a programmable logic device, discrete gate or transistor logic, a discrete hardware component, or any combination thereof). In some cases, the processor 1235 may be configured to operate a memory array using a memory controller. In some other cases, a memory controller may be integrated into the processor 1235. The processor 1235 may be configured to execute computer-readable instructions stored in a memory (e.g., the memory 1225) to cause the device 1205 to perform various functions (e.g., functions or tasks supporting spatial parameters for half-duplex and full-duplex communications). For example, the device 1205 or a component of the device 1205 may include a processor 1235 and memory 1225 coupled with the processor 1235, the processor 1235 and memory 1225 configured to perform various functions described herein. The processor 1235 may be an example of a cloud-computing platform (e.g., one or more physical nodes and supporting software such as operating systems, virtual machines, or container instances) that may host the functions (e.g., by executing code 1230) to perform the functions of the device 1205. The processor 1235 may be any one or more suitable processors capable of executing scripts or instructions of one or more software programs stored in the device 1205 (such as within the memory 1225). In some implementations, the processor 1235 may be a component of a processing system. A processing system may generally refer to a system or series of machines or components that receives inputs and processes the inputs to produce a set of outputs (which may be passed to other systems or components of, for example, the device 1205). For example, a processing system of the device 1205 may refer to a system including the various other components or subcomponents of the device 1205, such as the processor 1235, or the transceiver 1210, or the communications manager 1220, or other components or combinations of components of the device 1205. The processing system of the device 1205 may interface with other components of the device 1205 and may process information received from other components (such as inputs or signals) or output information to other components. For example, a chip or modem of the device 1205 may include a processing system and one or more interfaces to output information, or to obtain information, or both. The one or more interfaces may be implemented as or otherwise include a first interface configured to output information and a second interface configured to obtain information, or a same interface configured to output information and to obtain information, among other implementations. In some implementations, the one or more interfaces may refer to an interface between the processing system of the chip or modem and a transmitter, such that the device 1205 may transmit information output from the chip or modem. Additionally, or alternatively, in some implementations, the one or more interfaces may refer to an interface between the processing system of the chip or modem and a receiver, such that the device 1205 may obtain information or signal inputs, and the information may be passed to the processing system. A person having ordinary skill in the art will readily recognize that a first interface also may obtain information or signal inputs, and a second interface also may output information or signal outputs.

In some examples, a bus 1240 may support communications of (e.g., within) a protocol layer of a protocol stack. In some examples, a bus 1240 may support communications associated with a logical channel of a protocol stack (e.g., between protocol layers of a protocol stack), which may include communications performed within a component of the device 1205, or between different components of the device 1205 that may be co-located or located in different locations (e.g., where the device 1205 may refer to a system in which one or more of the communications manager 1220, the transceiver 1210, the memory 1225, the code 1230, and the processor 1235 may be located in one of the different components or divided between different components).

In some examples, the communications manager 1220 may manage aspects of communications with a core network 130 (e.g., via one or more wired or wireless backhaul links). For example, the communications manager 1220 may manage the transfer of data communications for client devices, such as one or more UEs 115. In some examples, the communications manager 1220 may manage communications with other network entities 105 and may include a controller or scheduler for controlling communications with UEs 115 in cooperation with other network entities 105. In some examples, the communications manager 1220 may support an X2 interface within an LTE/LTE-A wireless communications network technology to provide communication between network entities 105.

The communications manager 1220 may support wireless communication in accordance with examples as disclosed herein. For example, the communications manager 1220 may be configured as or otherwise support a means for receiving, from a first wireless node at a second wireless node, a configuration message indicating one or more spatial configurations for communications between the first wireless node and the second wireless node, where the one or more spatial configurations include. In some examples, to, the communications manager 1220 may be configured as or otherwise support a means for a first set of spatial parameters associated with half-duplex communications with the second wireless node and a second set of spatial parameters associated with full-duplex communications with the second wireless node. The communications manager 1220 may be configured as or otherwise support a means for communicating, by the second wireless node, with the first wireless node using the first set of spatial parameters or the second set of spatial parameters based on receiving the configuration message.

By including or configuring the communications manager 1220 in accordance with examples as described herein, the device 1205 may support techniques for indicating separate spatial parameters for half-duplex and full-duplex communications, which may decrease overhead and latency and increase quality of communications between wireless nodes.

In some examples, the communications manager 1220 may be configured to perform various operations (e.g., receiving, obtaining, monitoring, outputting, transmitting) using or otherwise in cooperation with the transceiver 1210, the one or more antennas 1215 (e.g., where applicable), or any combination thereof. Although the communications manager 1220 is illustrated as a separate component, in some examples, one or more functions described with reference to the communications manager 1220 may be supported by or performed by the transceiver 1210, the processor 1235, the memory 1225, the code 1230, or any combination thereof. For example, the code 1230 may include instructions executable by the processor 1235 to cause the device 1205 to perform various aspects of spatial parameters for half-duplex and full-duplex communications as described herein, or the processor 1235 and the memory 1225 may be otherwise configured to perform or support such operations.

Figure 13:
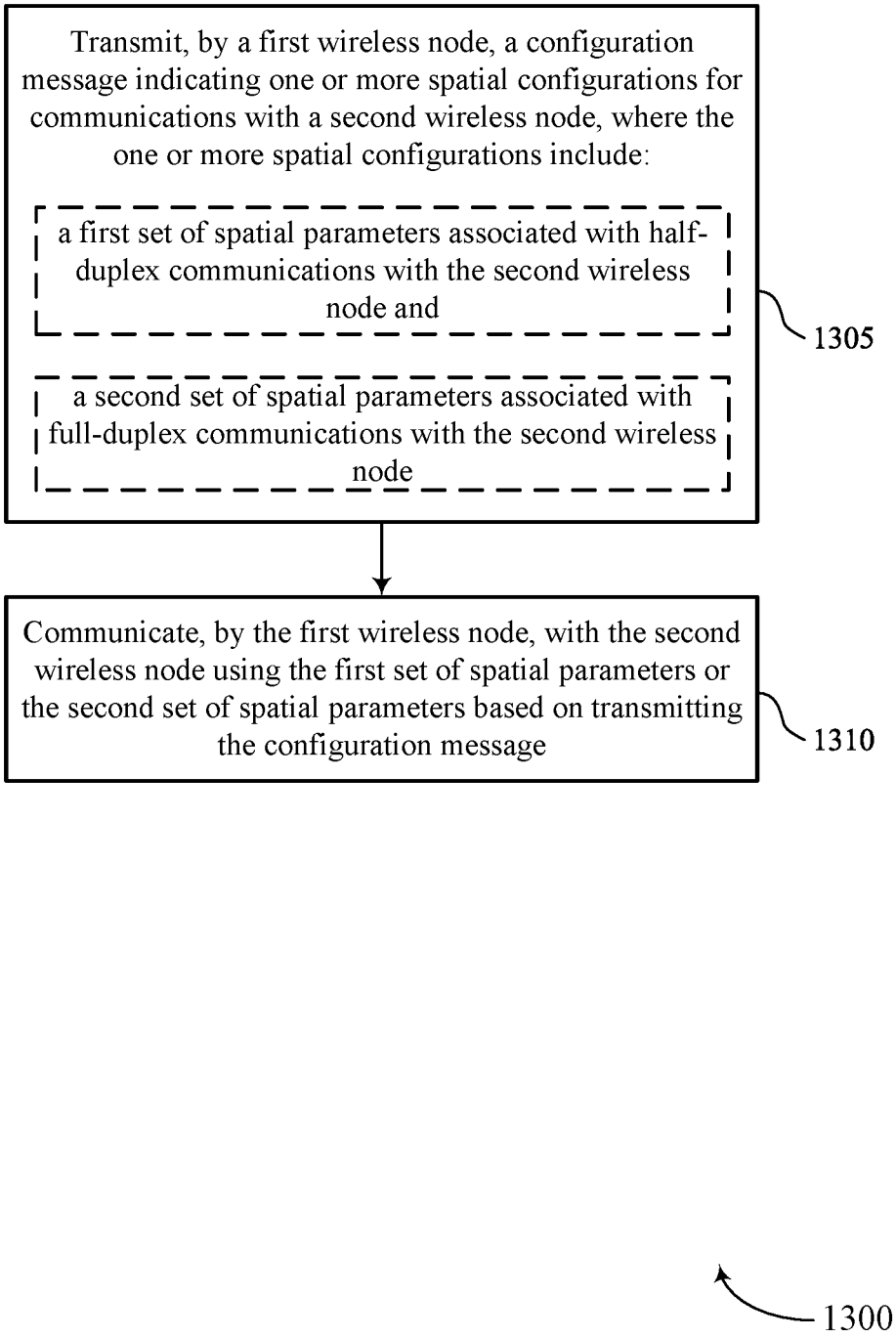
FIGS. 13 through 18 illustrate flowcharts showing methods that support spatial parameters for half-duplex and full-duplex communications in accordance with one or more aspects of the present disclosure.

FIG. 13 illustrates a flowchart illustrating a method 1300 that supports spatial parameters for half-duplex and full-duplex communications in accordance with one or more aspects of the present disclosure. The operations of the method 1300 may be implemented by a first wireless node or its components as described herein. For example, the operations of the method 1300 may be performed by a first wireless node as described with reference to FIGS. 1 through 8. In some examples, a first wireless node may execute a set of instructions to control the functional elements of the first wireless node to perform the described functions. Additionally, or alternatively, the first wireless node may perform aspects of the described functions using special-purpose hardware.

At 1305, the method may include transmitting, by a first wireless node, a configuration message indicating one or more spatial configurations for communications with a second wireless node, where the one or more spatial configurations include a first set of spatial parameters associated with half-duplex communications with the second wireless node and a second set of spatial parameters associated with full-duplex communications with the second wireless node. The operations of 1305 may be performed in accordance with examples as disclosed herein. In some examples, aspects of the operations of 1305 may be performed by a spatial configuration component 725 as described with reference to FIG. 7.

At 1310, the method may include communicating, by the first wireless node, with the second wireless node using the first set of spatial parameters or the second set of spatial parameters based on transmitting the configuration message. The operations of 1310 may be performed in accordance with examples as disclosed herein. In some examples, aspects of the operations of 1310 may be performed by a communication component 730 as described with reference to FIG. 7.

Figure 14:
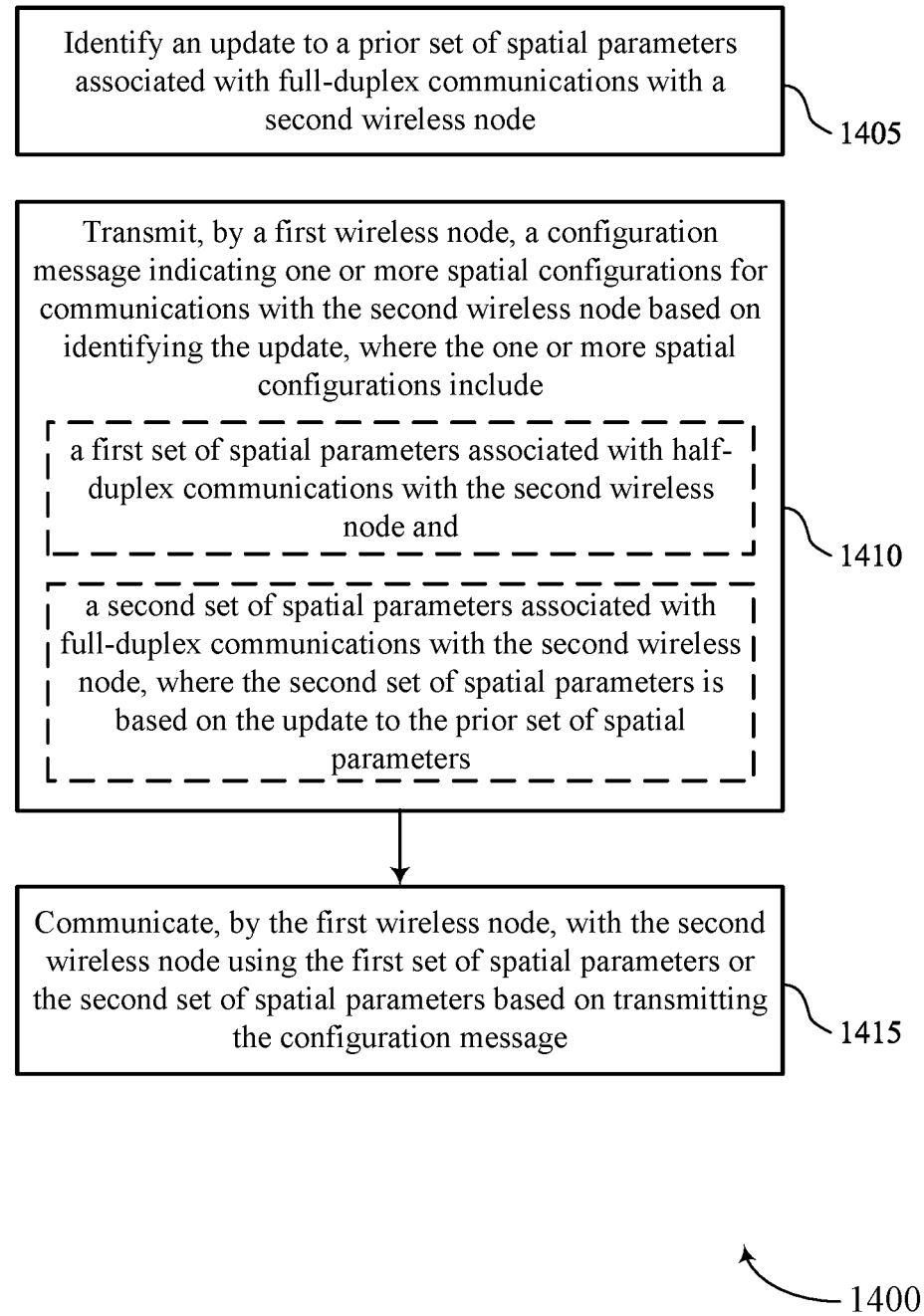

FIG. 14 illustrates a flowchart illustrating a method 1400 that supports spatial parameters for half-duplex and full-duplex communications in accordance with one or more aspects of the present disclosure. The operations of the method 1400 may be implemented by a first wireless node or its components as described herein. For example, the operations of the method 1400 may be performed by a first wireless node as described with reference to FIGS. 1 through 8. In some examples, a first wireless node may execute a set of instructions to control the functional elements of the first wireless node to perform the described functions. Additionally, or alternatively, the first wireless node may perform aspects of the described functions using special-purpose hardware.

At 1405, the method may include identifying an update to a prior set of spatial parameters associated with full-duplex communications with a second wireless node. The operations of 1405 may be performed in accordance with examples as disclosed herein. In some examples, aspects of the operations of 1405 may be performed by an update component 740 as described with reference to FIG. 7.

At 1410, the method may include transmitting, by a first wireless node, a configuration message indicating one or more spatial configurations for communications with the second wireless node, where the one or more spatial configurations include a first set of spatial parameters associated with half-duplex communications with the second wireless node and a second set of spatial parameters associated with full-duplex communications with the second wireless node, where the second set of spatial parameters is based on the update to the prior set of spatial parameters. The operations of 1410 may be performed in accordance with examples as disclosed herein. In some examples, aspects of the operations of 1410 may be performed by a spatial configuration component 725 as described with reference to FIG. 7.

At 1415, the method may include communicating, by the first wireless node, with the second wireless node using the first set of spatial parameters or the second set of spatial parameters based on transmitting the configuration message. The operations of 1415 may be performed in accordance with examples as disclosed herein. In some examples, aspects of the operations of 1415 may be performed by a communication component 730 as described with reference to FIG. 7.

Figure 15:
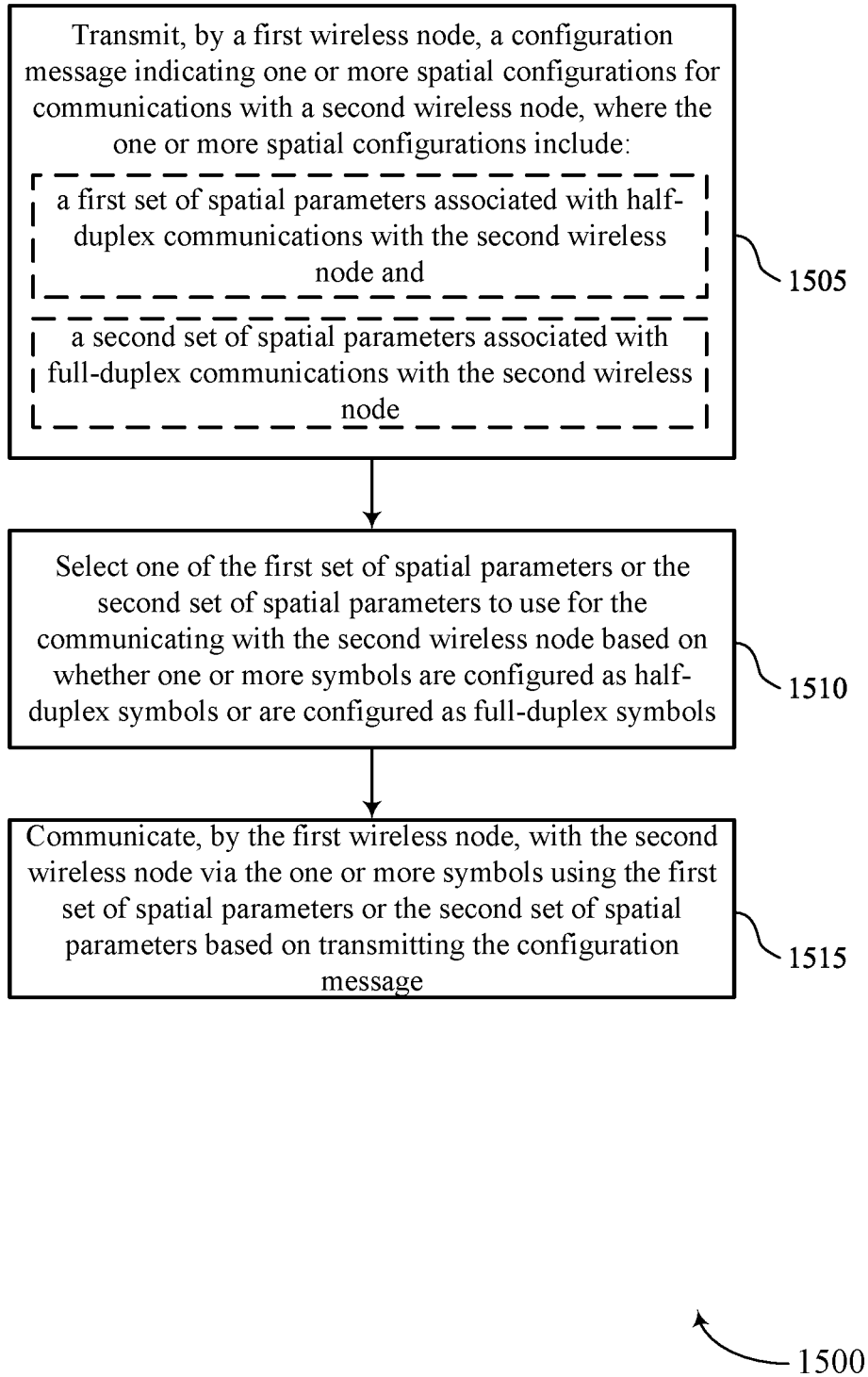

FIG. 15 illustrates a flowchart illustrating a method 1500 that supports spatial parameters for half-duplex and full-duplex communications in accordance with one or more aspects of the present disclosure. The operations of the method 1500 may be implemented by a first wireless node or its components as described herein. For example, the operations of the method 1500 may be performed by a first wireless node as described with reference to FIGS. 1 through 8. In some examples, a first wireless node may execute a set of instructions to control the functional elements of the first wireless node to perform the described functions. Additionally, or alternatively, the first wireless node may perform aspects of the described functions using special-purpose hardware.

At 1505, the method may include transmitting, by a first wireless node, a configuration message indicating one or more spatial configurations for communications with a second wireless node, where the one or more spatial configurations include a first set of spatial parameters associated with half-duplex communications with the second wireless node and a second set of spatial parameters associated with full-duplex communications with the second wireless node. The operations of 1505 may be performed in accordance with examples as disclosed herein. In some examples, aspects of the operations of 1505 may be performed by a spatial configuration component 725 as described with reference to FIG. 7.

At 1510, the method may include selecting one of the first set of spatial parameters or the second set of spatial parameters to use for the communicating with the second wireless node based on whether one or more symbols are configured as half-duplex symbols or are configured as full-duplex symbols. The operations of 1510 may be performed in accordance with examples as disclosed herein. In some examples, aspects of the operations of 1510 may be performed by a selection component 745 as described with reference to FIG. 7.

At 1515, the method may include communicating, by the first wireless node, with the second wireless node via the one or more symbols using the first set of spatial parameters or the second set of spatial parameters based on transmitting the configuration message. The operations of 1515 may be performed in accordance with examples as disclosed herein. In some examples, aspects of the operations of 1515 may be performed by a communication component 730 as described with reference to FIG. 7.

Figure 16:
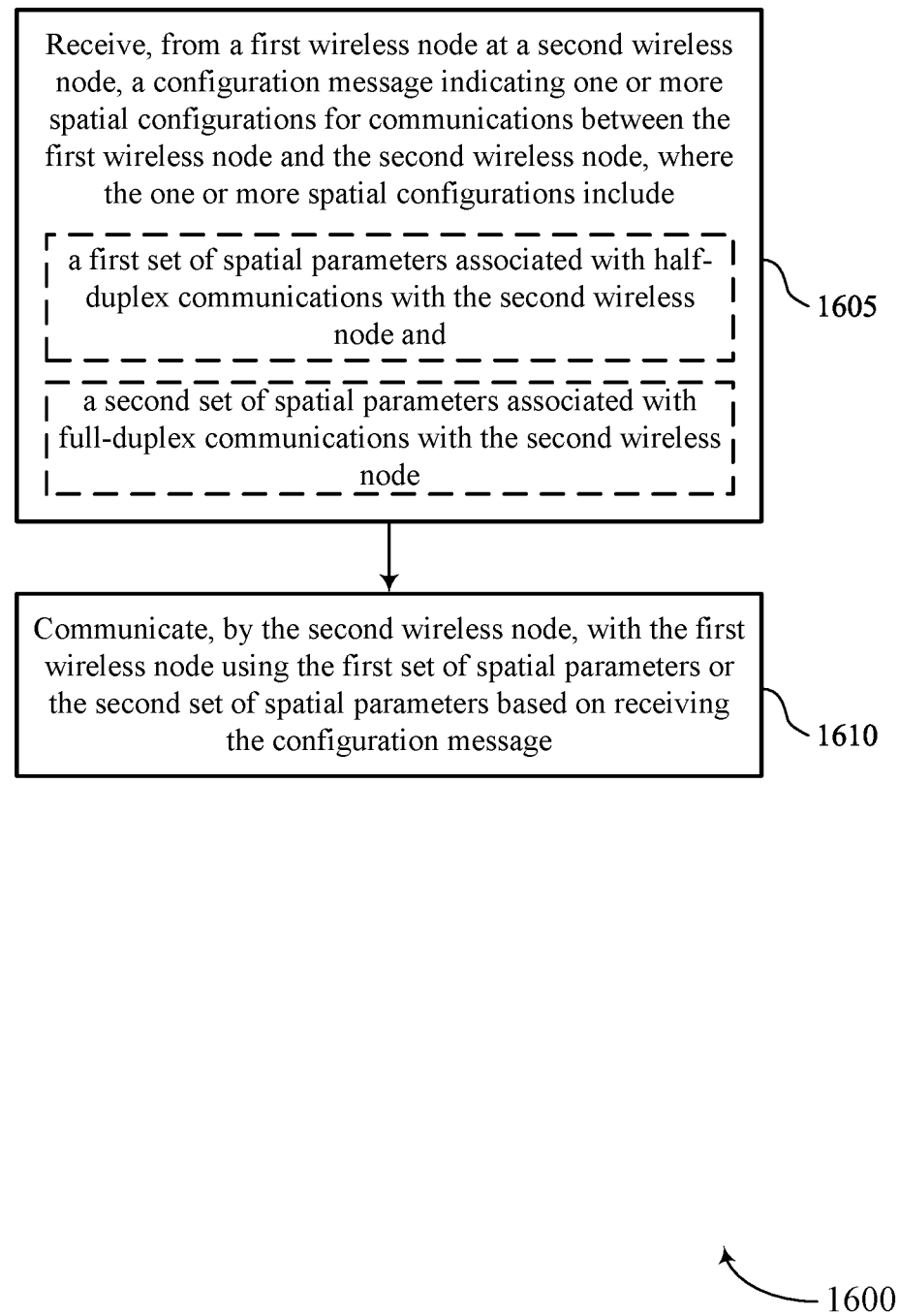

FIG. 16 illustrates a flowchart illustrating a method 1600 that supports spatial parameters for half-duplex and full-duplex communications in accordance with one or more aspects of the present disclosure. The operations of the method 1600 may be implemented by a second wireless node or its components as described herein. For example, the operations of the method 1600 may be performed by a second wireless node as described with reference to FIGS. 1 through 4 and 9 through 12. In some examples, a second wireless node may execute a set of instructions to control the functional elements of the second wireless node to perform the described functions. Additionally, or alternatively, the second wireless node may perform aspects of the described functions using special-purpose hardware.

At 1605, the method may include receiving, from a first wireless node at a second wireless node, a configuration message indicating one or more spatial configurations for communications between the first wireless node and the second wireless node, where the one or more spatial configurations include a first set of spatial parameters associated with half-duplex communications with the second wireless node and a second set of spatial parameters associated with full-duplex communications with the second wireless node. The operations of 1605 may be performed in accordance with examples as disclosed herein. In some examples, aspects of the operations of 1605 may be performed by a configuration message component 1125 as described with reference to FIG. 11.

At 1610, the method may include communicating, by the second wireless node, with the first wireless node using the first set of spatial parameters or the second set of spatial parameters based on receiving the configuration message. The operations of 1610 may be performed in accordance with examples as disclosed herein. In some examples, aspects of the operations of 1610 may be performed by a spatial parameter component 1130 as described with reference to FIG. 11.

Figure 17:
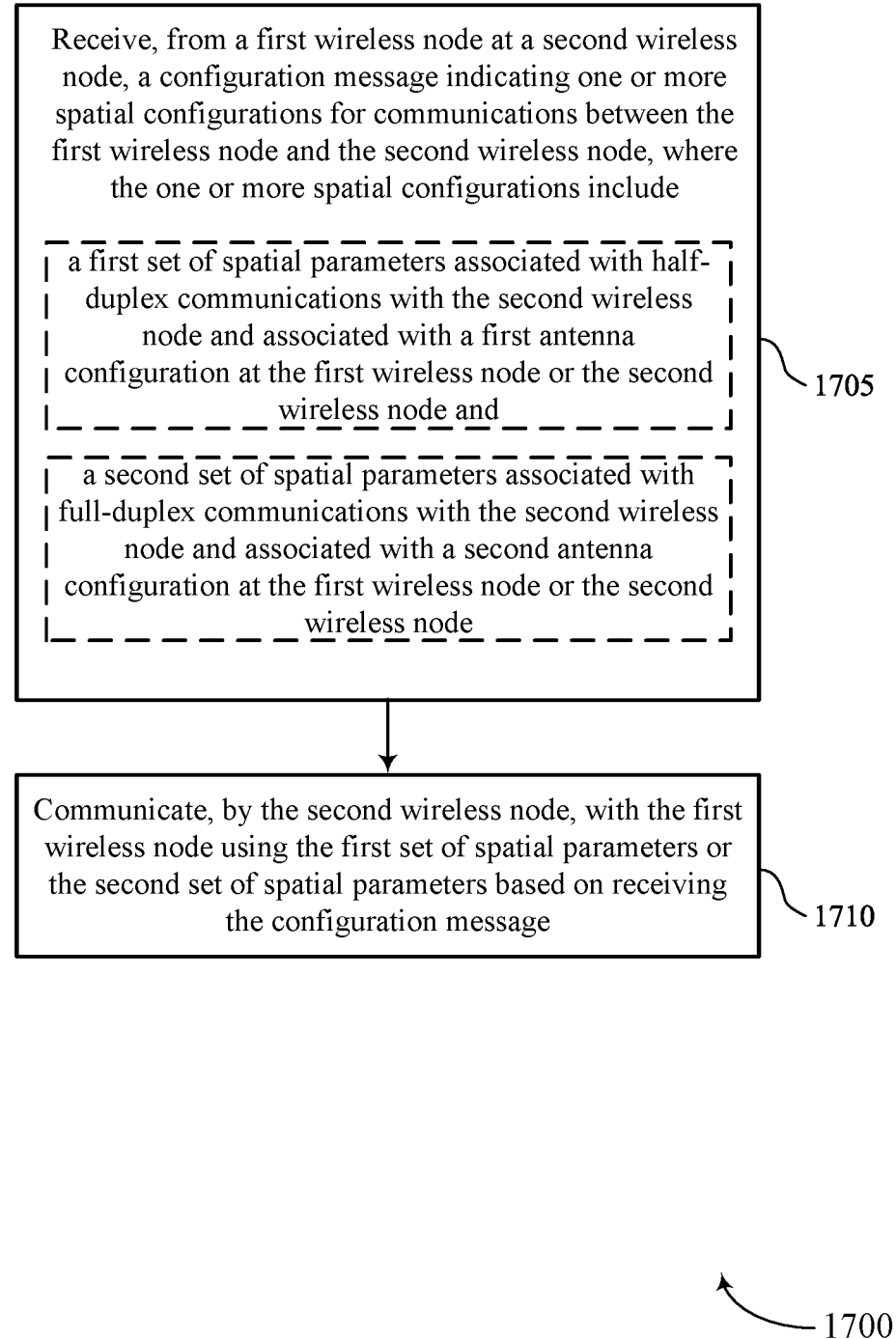

FIG. 17 illustrates a flowchart illustrating a method 1700 that supports spatial parameters for half-duplex and full-duplex communications in accordance with one or more aspects of the present disclosure. The operations of the method 1700 may be implemented by a second wireless node or its components as described herein. For example, the operations of the method 1700 may be performed by a second wireless node as described with reference to FIGS. 1 through 4 and 9 through 12. In some examples, a second wireless node may execute a set of instructions to control the functional elements of the second wireless node to perform the described functions. Additionally, or alternatively, the second wireless node may perform aspects of the described functions using special-purpose hardware.

At 1705, the method may include receiving, from a first wireless node at a second wireless node, a configuration message indicating one or more spatial configurations for communications between the first wireless node and the second wireless node, where the one or more spatial configurations include a first set of spatial parameters associated with half-duplex communications with the second wireless node and associated with a first antenna configuration at the first wireless node or the second wireless node, and a second set of spatial parameters associated with full-duplex communications with the second wireless node and associated with a second antenna configuration at the first wireless node or the second wireless node. The operations of 1705 may be performed in accordance with examples as disclosed herein. In some examples, aspects of the operations of 1705 may be performed by a configuration message component 1125 as described with reference to FIG. 11.

At 1710, the method may include communicating, by the second wireless node, with the first wireless node using the first set of spatial parameters or the second set of spatial parameters based on receiving the configuration message. The operations of 1710 may be performed in accordance with examples as disclosed herein. In some examples, aspects of the operations of 1710 may be performed by a spatial parameter component 1130 as described with reference to FIG. 11.

Figure 18:
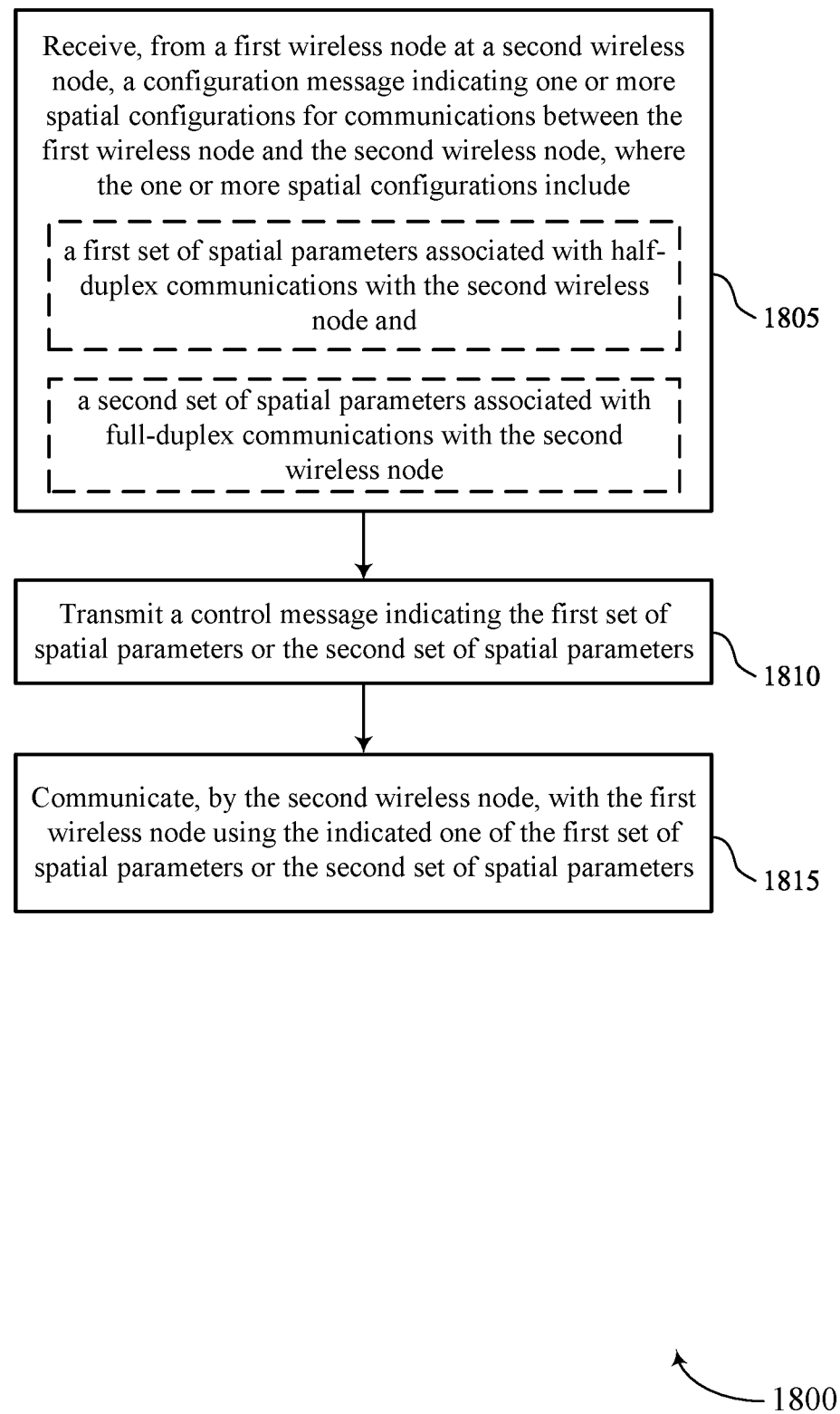

FIG. 18 illustrates a flowchart illustrating a method 1800 that supports spatial parameters for half-duplex and full-duplex communications in accordance with one or more aspects of the present disclosure. The operations of the method 1800 may be implemented by a second wireless node or its components as described herein. For example, the operations of the method 1800 may be performed by a second wireless node as described with reference to FIGS. 1 through 4 and 9 through 12. In some examples, a second wireless node may execute a set of instructions to control the functional elements of the second wireless node to perform the described functions. Additionally, or alternatively, the second wireless node may perform aspects of the described functions using special-purpose hardware.

At 1805, the method may include receiving, from a first wireless node at a second wireless node, a configuration message indicating one or more spatial configurations for communications between the first wireless node and the second wireless node, where the one or more spatial configurations include a first set of spatial parameters associated with half-duplex communications with the second wireless node and a second set of spatial parameters associated with full-duplex communications with the second wireless node. The operations of 1805 may be performed in accordance with examples as disclosed herein. In some examples, aspects of the operations of 1805 may be performed by a configuration message component 1125 as described with reference to FIG. 11.

At 1810, the method may include transmitting a control message indicating the first set of spatial parameters or the second set of spatial parameters. The operations of 1810 may be performed in accordance with examples as disclosed herein. In some examples, aspects of the operations of 1810 may be performed by an indication component 1145 as described with reference to FIG. 11.

At 1815, the method may include communicating, by the second wireless node, with the first wireless node using the indicated one of the first set of spatial parameters of the second set of spatial parameters. The operations of 1815 may be performed in accordance with examples as disclosed herein. In some examples, aspects of the operations of 1815 may be performed by a spatial parameter component 1130 as described with reference to FIG. 11.

The following provides an overview of aspects of the present disclosure:

Aspect 1: A method for wireless communication, comprising: transmitting, by a first wireless node, a configuration message indicating one or more spatial configurations for communications with a second wireless node, wherein the one or more spatial configurations comprise: a first set of spatial parameters associated with half-duplex communications with the second wireless node; and a second set of spatial parameters associated with full-duplex communications with the second wireless node; and communicating, by the first wireless node, with the second wireless node using the first set of spatial parameters or the second set of spatial parameters based at least in part on transmitting the configuration message.

Aspect 2: The method of aspect 1, wherein the first set of spatial parameters associated with the half-duplex communications with the second wireless node are associated with a first antenna configuration at the first wireless node or the second wireless node, and wherein the second set of spatial parameters associated with the full-duplex communications with the second wireless node are associated with a second antenna configuration at the first wireless node or the second wireless node.

Aspect 3: The method of any of aspects 1 through 2, wherein the configuration message indicates, for each reference signal of a plurality of reference signals associated with a beam measurement report, a respective set of spatial parameters associated with full-duplex communications via a beam direction corresponding to the reference signal, and wherein the respective set of spatial parameters for one of the plurality of reference signals comprises the second set of spatial parameters.

Aspect 4: The method of any of aspects 1 through 3, further comprising: identifying an update to a prior set of spatial parameters associated with the full-duplex communications with the second wireless node, wherein the second set of spatial parameters is based at least in part on the update to the prior set of spatial parameters, and wherein transmitting the configuration message comprising the one or more spatial configurations is based at least in part on identifying the update.

Aspect 5: The method of aspect 4, wherein transmitting the configuration message comprises: transmitting an uplink grant obtained via a scheduling request or an uplink shared channel transmission comprising the configuration message.

Aspect 6: The method of any of aspects 1 through 5, wherein the configuration message indicates a respective set of downlink spatial parameters, a respective set of uplink spatial parameters, or both for each reference signal of a plurality of reference signals.

Aspect 7: The method of any of aspects 1 through 6, wherein the communicating with the second wireless node occurs via one or more symbols, the method further comprising: selecting one of the first set of spatial parameters or the second set of spatial parameters to use for the communicating with the second wireless node based at least in part on whether the one or more symbols are configured as half-duplex symbols or are configured as full-duplex symbols.

Aspect 8: The method of any of aspects 1 through 7, further comprising: receiving a control message indicating the first set of spatial parameters or the second set of spatial parameters; and selecting one of the first set of spatial parameters or the second set of spatial parameters to use for the communicating with the second wireless node based at least in part on the control message.

Aspect 9: The method of any of aspects 1 through 8, wherein the communicating with the second wireless node occurs via a plurality of shared channels comprising a plurality of downlink shared channels or a plurality of uplink shared channels, the method further comprising: receiving a control message scheduling the plurality of shared channels; and selecting, for each shared channel of the plurality of shared channels, one of the first set of spatial parameters or the second set of spatial parameters to use for communicating via the shared channel based at least in part on whether the shared channel is scheduled for one or more half-duplex symbols or is scheduled for one or more full-duplex symbols.

Aspect 10: The method of any of aspects 1 through 9, wherein the communicating with the second wireless node occurs via a plurality of shared channels comprising a plurality of downlink shared channels or a plurality of uplink shared channels, the method further comprising: receiving a control message scheduling the plurality of shared channels and indicating, for each of the plurality of shared channels, whether the first wireless node is to use the first set of spatial parameters or the second set of spatial parameters for the shared channel; and selecting, for each shared channel of the plurality of shared channels, one of the first set of spatial parameters or the second set of spatial parameters to use for communicating via the shared channel based at least in part on the control message.

Aspect 11: The method of any of aspects 1 through 10, wherein the second set of spatial parameters comprises a multiple-input multiple-output parameter, a port parameter, a resource parameter, a transmission-reception point scheme parameter or any combination thereof associated with the full-duplex communications with the second wireless node, and wherein the second set of spatial parameters is associated with uplink transmissions or downlink transmissions.

Aspect 12: A method for wireless communication, comprising: receiving, from a first wireless node at a second wireless node, a configuration message indicating one or more spatial configurations for communications between the first wireless node and the second wireless node, wherein the one or more spatial configurations comprise: a first set of spatial parameters associated with half-duplex communications with the second wireless node; and a second set of spatial parameters associated with full-duplex communications with the second wireless node; and communicating, by the second wireless node, with the first wireless node using the first set of spatial parameters or the second set of spatial parameters based at least in part on receiving the configuration message.

Aspect 13: The method of aspect 12, wherein the first set of spatial parameters associated with the half-duplex communications with the second wireless node are associated with a first antenna configuration at the first wireless node or the second wireless node, and wherein the second set of spatial parameters associated with the full-duplex communications with the second wireless node are associated with a second antenna configuration at the first wireless node or the second wireless node.

Aspect 14: The method of any of aspects 12 through 13, wherein the configuration message indicates, for each reference signal of a plurality of reference signals associated with a beam measurement report, a respective set of spatial parameters associated with full-duplex communications via a beam direction corresponding to the reference signal, and wherein the respective set of spatial parameters for one of the plurality of reference signals comprises the second set of spatial parameters.

Aspect 15: The method of any of aspects 12 through 14, wherein receiving the configuration message is based at least in part on an update to a prior set of spatial parameters associated with the full-duplex communications between the first wireless node and the second wireless node, and wherein the second set of spatial parameters is based at least in part on the update to the prior set of spatial parameters.

Aspect 16: The method of any of aspects 12 through 15, wherein receiving the configuration message comprises: receiving an uplink grant obtained via a scheduling request or an uplink shared channel transmission comprising the configuration message.

Aspect 17: The method of any of aspects 12 through 16, wherein the configuration message indicates a respective set of downlink spatial parameters, a respective set of uplink spatial parameters, or both for each reference signal of a plurality of reference signals.

Aspect 18: The method of any of aspects 12 through 17, wherein the communicating with the first wireless node occurs via one or more symbols, the method further comprising: identifying one of the first set of spatial parameters or the second set of spatial parameters for the communicating with the second wireless node based at least in part on whether the one or more symbols are configured as half-duplex symbols or are configured as full-duplex symbols.

Aspect 19: The method of any of aspects 12 through 18, further comprising: transmitting a control message indicating the first set of spatial parameters or the second set of spatial parameters, wherein the communicating with the first wireless node is based at least in part on the indicated one of the first set of spatial parameters or the second set of spatial parameters.

Aspect 20: The method of any of aspects 12 through 19, wherein the communicating with the first wireless node occurs via a plurality of shared channels comprising a plurality of downlink shared channels or a plurality of uplink shared channels, the method further comprising: transmitting a control message scheduling the plurality of shared channels, wherein, for each shared channel of the plurality of shared channels, whether the first set of spatial parameters or the second set of spatial parameters is used for communicating via the shared channel is based at least in part on whether the shared channel is scheduled for one or more half-duplex symbols or is scheduled for one or more full-duplex symbols.

Aspect 21: The method of any of aspects 12 through 20, wherein the communicating with the first wireless node occurs via a plurality of shared channels comprising a plurality of downlink shared channels or a plurality of uplink shared channels, the method further comprising: transmitting a control message scheduling the plurality of shared channels and indicating, for each of the plurality of shared channels, whether the first wireless node is to use the first set of spatial parameters or the second set of spatial parameters, wherein for each shared channel of the plurality of shared channels, the indicated one of the first set of spatial parameters or the second set of spatial parameters is used for communicating via the shared channel.

Aspect 22: The method of any of aspects 12 through 21, wherein the second set of spatial parameters comprises a multiple-input multiple-output parameter, a port parameter, a resource parameter, a transmission-reception point scheme parameter, or any combination thereof associated with the full-duplex communications with the second wireless node, and wherein the second set of spatial parameters is associated with uplink transmissions or downlink transmissions.

Aspect 23: An apparatus for wireless communication, comprising a processor; memory coupled with the processor; and instructions stored in the memory and executable by the processor to cause the apparatus to perform a method of any of aspects 1 through 11.

Aspect 24: An apparatus for wireless communication, comprising at least one means for performing a method of any of aspects 1 through 11.

Aspect 25: A non-transitory computer-readable medium storing code for wireless communication, the code comprising instructions executable by a processor to perform a method of any of aspects 1 through 11.

Aspect 26: An apparatus for wireless communication, comprising a processor; memory coupled with the processor; and instructions stored in the memory and executable by the processor to cause the apparatus to perform a method of any of aspects 12 through 22.

Aspect 27: An apparatus for wireless communication, comprising at least one means for performing a method of any of aspects 12 through 22.

Aspect 28: A non-transitory computer-readable medium storing code for wireless communication, the code comprising instructions executable by a processor to perform a method of any of aspects 12 through 22.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed using a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor but, in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented using hardware, software executed by a processor, firmware, or any combination thereof. If implemented using software executed by a processor, the functions may be stored as or transmitted using one or more instructions or code of a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one location to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc. Disks may reproduce data magnetically, and discs may reproduce data optically using lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a variety of actions and, therefore, "determining" can include calculating, computing, processing, deriving, investigating, looking up (such as via looking up in a table, a database, or another data structure), ascertaining and the like. Also, "determining" can include receiving (e.g., receiving information), accessing (e.g., accessing data stored in memory) and the like. Also, "determining" can include resolving, obtaining, selecting, choosing, establishing, and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A first wireless node, comprising:
   one or more memories storing processor-executable code; and
   one or more processors coupled with the one or more memories and individually or collectively operable to execute the code to cause the first wireless node to:
      transmit a configuration message indicating one or more spatial configurations for communications with a second wireless node, wherein the one or more spatial configurations comprise a first set of spatial parameters associated with half-duplex communications with the second wireless node and a second set of spatial parameters associated with full-duplex communications with the second wireless node, wherein the configuration message is based at least in part on an update to a prior set of spatial parameters associated with the full-duplex communications between the first wireless node and the second wireless node, and wherein the second set of spatial parameters is based at least in part on the update to the prior set of spatial parameters; and
      communicate with the second wireless node using the first set of spatial parameters or the second set of spatial parameters based at least in part on transmitting the configuration message.

2. The first wireless node of claim 1, wherein the first set of spatial parameters associated with the half-duplex communications with the second wireless node are associated with a first antenna configuration at the first wireless node or the second wireless node, and wherein the second set of spatial parameters associated with the full-duplex communications with the second wireless node are associated with a second antenna configuration at the first wireless node or the second wireless node.

3. The first wireless node of claim 1, wherein the configuration message indicates, for each reference signal of a plurality of reference signals associated with a beam measurement report, a respective set of spatial parameters associated with full-duplex communications via a beam direction corresponding to the reference signal, and wherein the respective set of spatial parameters for one of the plurality of reference signals comprises the second set of spatial parameters.

4. The first wireless node of claim 1, wherein the one or more processors are individually or collectively operable to execute the code to cause the first wireless node to:
identify the update to the prior set of spatial parameters associated with the full-duplex communications with the second wireless node, and
wherein transmitting the configuration message comprising the one or more spatial configurations is based at least in part on identifying the update.

5. The first wireless node of claim 4, wherein, to transmit the configuration message, the one or more processors are individually or collectively operable to execute the code to cause the first wireless node to:
transmit an uplink grant obtained via a scheduling request or an uplink shared channel transmission comprising the configuration message.

6. The first wireless node of claim 1, wherein the configuration message indicates a respective set of downlink spatial parameters, a respective set of uplink spatial parameters, or both for each reference signal of a plurality of reference signals.

7. The first wireless node of claim 1, wherein the the one or more processors are individually or collectively operable to execute the code to cause the first wireless node to perform the communication with the second wireless node via one or more symbols, and wherein the one or more processors are individually or collectively further operable to execute the code to cause the first wireless node to:
select one of the first set of spatial parameters or the second set of spatial parameters to use for the communicating with the second wireless node based at least in part on whether the one or more symbols are configured as half-duplex symbols or are configured as full-duplex symbols.

8. The first wireless node of claim 1, wherein the one or more processors are individually or collectively further operable to execute the code to cause the first wireless node to:
receive a control message indicating the first set of spatial parameters or the second set of spatial parameters; and
select one of the first set of spatial parameters or the second set of spatial parameters to use for the communicating with the second wireless node based at least in part on the control message.

9. The first wireless node of claim 1, wherein the the one or more processors are individually or collectively operable to execute the code to cause the first wireless node to perform the communication with the second wireless node via a plurality of shared channels comprising a plurality of downlink shared channels or a plurality of uplink shared channels, and wherein the one or more processors are individually or collectively further operable to execute the code to cause the first wireless node to:
receive a control message scheduling the plurality of shared channels; and
select, for each shared channel of the plurality of shared channels, one of the first set of spatial parameters or the second set of spatial parameters to use for communicating via the shared channel based at least in part on whether the shared channel is scheduled for one or more half-duplex symbols or is scheduled for one or more full-duplex symbols.

10. The first wireless node of claim 1, wherein the one or more processors are individually or collectively operable to execute the code to cause the first wireless node to perform the communication with the second wireless node via a plurality of shared channels comprising a plurality of downlink shared channels or a plurality of uplink shared channels, and wherein the one or more processors are individually or collectively further operable to execute the code to cause the first wireless node to:
receive a control message scheduling the plurality of shared channels and indicating, for each of the plurality of shared channels, whether the first wireless node is to use the first set of spatial parameters or the second set of spatial parameters for the shared channel; and
select, for each shared channel of the plurality of shared channels, one of the first set of spatial parameters or the second set of spatial parameters to use for communicating via the shared channel based at least in part on the control message.

11. The first wireless node of claim 1, wherein the second set of spatial parameters comprises a multiple-input multiple-output parameter, a port parameter, a resource parameter, a transmission-reception point scheme parameter, or any combination thereof associated with the full-duplex communications with the second wireless node, and wherein the second set of spatial parameters is associated with uplink transmissions or downlink transmissions.

12. A second wireless node, comprising:
one or more memories storing processor-executable code; and
one or more processors coupled with the one or more memories and individually or collectively operable to execute the code to cause the second wireless node to:
receive, from a first wireless node at a second wireless node, a configuration message indicating one or more spatial configurations for communications between the first wireless node and the second wireless node, wherein the one or more spatial configurations comprise a first set of spatial parameters associated with half-duplex communications with the second wireless node and a second set of spatial parameters associated with full-duplex communications with the second wireless node, wherein the configuration message is based at least in part on an update to a prior set of spatial parameters associated with the full-duplex communications between the first wireless node and the second wireless node, and wherein the second set of spatial parameters is based at least in part on the update to the prior set of spatial parameters; and
communicate, by the second wireless node, with the first wireless node using the first set of spatial parameters or the second set of spatial parameters based at least in part on receiving the configuration message.

13. The second wireless node of claim 12, wherein the first set of spatial parameters associated with the half-duplex communications with the second wireless node are associated with a first antenna configuration at the first wireless node or the second wireless node, and wherein the second set of spatial parameters associated with the full-duplex communications with the second wireless node are associated with a second antenna configuration at the first wireless node or the second wireless node.

14. The second wireless node of claim 12, wherein the configuration message indicates, for each reference signal of a plurality of reference signals associated with a beam measurement report, a respective set of spatial parameters associated with full-duplex communications via a beam direction corresponding to the reference signal, and wherein the respective set of spatial parameters for one of the plurality of reference signals comprises the second set of spatial parameters.

15. The second wireless node of claim 12, wherein, to receive the configuration message, the one or more processors are individually or collectively operable to execute the code to cause the second wireless node to:
receive an uplink grant obtained via a scheduling request or an uplink shared channel transmission comprising the configuration message.

16. The second wireless node of claim 12, wherein the configuration message indicates a respective set of downlink spatial parameters, a respective set of uplink spatial parameters, or both for each reference signal of a plurality of reference signals.

17. The second wireless node of claim 12, wherein the one or more processors are individually or collectively operable to execute the code to cause the second wireless node to perform the communication with the first wireless node via one or more symbols, and wherein the one or more processors are individually or collectively further operable to execute the code to cause the second wireless node to:
identify one of the first set of spatial parameters or the second set of spatial parameters for the communicating with the second wireless node based at least in part on whether the one or more symbols are configured as half-duplex symbols or are configured as full-duplex symbols.

18. The second wireless node of claim 12, wherein the one or more processors are individually or collectively further operable to execute the code to cause the second wireless node to:
transmit a control message indicating the first set of spatial parameters or the second set of spatial parameters, wherein the communicating with the first wireless node is based at least in part on the indicated one of the first set of spatial parameters or the second set of spatial parameters.

19. The second wireless node of claim 12, wherein the one or more processors are individually or collectively further operable to execute the code to cause the second wireless node to perform the communication with the first wireless node via a plurality of shared channels comprising a plurality of downlink shared channels or a plurality of uplink shared channels, and wherein the one or more processors are individually or collectively further operable to execute the code to cause the second wireless node to:
transmit a control message scheduling the plurality of shared channels, wherein, for each shared channel of the plurality of shared channels, whether the first set of spatial parameters or the second set of spatial parameters is used for communicating via the shared channel is based at least in part on whether the shared channel is scheduled for one or more half-duplex symbols or is scheduled for one or more full-duplex symbols.

20. The second wireless node of claim 12, wherein the one or more processors are individually or collectively operable to execute the code to cause the second wireless node to perform the communication with the first wireless node via a plurality of shared channels comprising a plurality of downlink shared channels or a plurality of uplink shared channels, and wherein the one or more processors are individually or collectively further operable to execute the code to cause the second wireless node to:
transmit a control message scheduling the plurality of shared channels and indicating, for each of the plurality of shared channels, whether the first wireless node is to use the first set of spatial parameters or the second set of spatial parameters, wherein for each shared channel of the plurality of shared channels, the indicated one of the first set of spatial parameters or the second set of spatial parameters is used for communicating via the shared channel.

21. The second wireless node of claim 12, wherein the second set of spatial parameters comprises a multiple-input multiple-output parameter, a port parameter, a resource parameter, a transmission-reception point scheme parameter, or any combination thereof associated with the full-duplex communications with the second wireless node, and wherein the second set of spatial parameters is associated with uplink transmissions or downlink transmissions.

22. A method for wireless communication, comprising:
transmitting, by a first wireless node, a configuration message indicating one or more spatial configurations for communications with a second wireless node, wherein the one or more spatial configurations comprise:
a first set of spatial parameters associated with half-duplex communications with the second wireless node; and
a second set of spatial parameters associated with full-duplex communications with the second wireless node; and
communicating, by the first wireless node, with the second wireless node using the first set of spatial parameters or the second set of spatial parameters based at least in part on transmitting the configuration message, wherein the configuration message is based at least in part on an update to a prior set of spatial parameters associated with the full-duplex communications between the first wireless node and the second wireless node, and wherein the second set of spatial parameters is based at least in part on the update to the prior set of spatial parameters.

23. The method of claim 22, wherein the first set of spatial parameters associated with the half-duplex communications with the second wireless node are associated with a first antenna configuration at the first wireless node or the second wireless node, and wherein the second set of spatial parameters associated with the full-duplex communications with the second wireless node are associated with a second antenna configuration at the first wireless node or the second wireless node.

24. The method of claim 22, wherein the configuration message indicates, for each reference signal of a plurality of reference signals associated with a beam measurement report, a respective set of spatial parameters associated with full-duplex communications via a beam direction corresponding to the reference signal, and wherein the respective set of spatial parameters for one of the plurality of reference signals comprises the second set of spatial parameters.

25. The method of claim 22, further comprising:
identifying the update to the prior set of spatial parameters associated with the full-duplex communications with the second wireless node, and
wherein transmitting the configuration message comprising the one or more spatial configurations is based at least in part on identifying the update.

26. A method for wireless communication, comprising:
receiving, from a first wireless node at a second wireless node, a configuration message indicating one or more spatial configurations for communications between the first wireless node and the second wireless node, wherein the one or more spatial configurations comprise:
a first set of spatial parameters associated with half-duplex communications with the second wireless node; and
a second set of spatial parameters associated with full-duplex communications with the second wireless node; and
communicating, by the second wireless node, with the first wireless node using the first set of spatial parameters or the second set of spatial parameters based at least in part on receiving the configuration message, wherein the configuration message is based at least in part on an update to a prior set of spatial parameters associated with the full-duplex communications between the first wireless node and the second wireless node, and wherein the second set of spatial parameters is based at least in part on the update to the prior set of spatial parameters.

27. The method of claim 26, wherein the first set of spatial parameters associated with the half-duplex communications with the second wireless node are associated with a first antenna configuration at the first wireless node or the second wireless node, and wherein the second set of spatial parameters associated with the full-duplex communications with the second wireless node are associated with a second antenna configuration at the first wireless node or the second wireless node.

28. The method of claim 26, wherein the configuration message indicates, for each reference signal of a plurality of reference signals associated with a beam measurement report, a respective set of spatial parameters associated with full-duplex communications via a beam direction corresponding to the reference signal, and wherein the respective set of spatial parameters for one of the plurality of reference signals comprises the second set of spatial parameters.

29. The method of claim 26, wherein receiving the configuration message is based at least in part on the update to the prior set of spatial parameters associated with the full-duplex communications between the first wireless node and the second wireless node.

* * * * *